United States Patent
Montojo et al.

(10) Patent No.: US 10,212,648 B2
(45) Date of Patent: Feb. 19, 2019

(54) REFERENCE SIGNAL DESIGN FOR CELL SEARCH IN AN ORTHOGONAL WIRELESS COMMUNICATION SYSTEM

(71) Applicant: QUALCOMM Incorporated, San Diego, CA (US)

(72) Inventors: Juan Montojo, San Diego, CA (US); Byoung-Hoon Kim, Seoul (KR); Durga Prasad Malladi, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/694,651

(22) Filed: Sep. 1, 2017

(65) Prior Publication Data

US 2018/0014244 A1   Jan. 11, 2018

Related U.S. Application Data

(60) Continuation of application No. 14/469,205, filed on Aug. 26, 2014, now Pat. No. 9,781,663, which is a
(Continued)

(51) Int. Cl.
*H04B 7/204* (2006.01)
*H04W 48/16* (2009.01)
(Continued)

(52) U.S. Cl.
CPC ......... *H04W 48/16* (2013.01); *H04J 11/0069* (2013.01); *H04L 5/0048* (2013.01);
(Continued)

(58) Field of Classification Search
None
See application file for complete search history.

(56) References Cited

U.S. PATENT DOCUMENTS

| 6,952,454 B1 | 10/2005 | Jalali et al. |
| 7,496,113 B2 | 2/2009 | Cai et al. |

(Continued)

FOREIGN PATENT DOCUMENTS

| EP | 1533950 A1 | 5/2005 |
| JP | 2007336499 A | 12/2007 |

(Continued)

OTHER PUBLICATIONS

Ericsson AB: "Downlink Reference Signals Discussion" [Online] No. R1-063008, pp. 1-4 (Oct. 10, 2006) XP002480597.
(Continued)

*Primary Examiner* — Ayaz R Sheikh
*Assistant Examiner* — Sori A Aga
(74) *Attorney, Agent, or Firm* — Holland & Hart LLP

(57) ABSTRACT

Systems and methodologies are described that facilitate efficient cell acquisition in a wireless communication system. In one aspect, a reference signal for use in cell acquisition can be constructed in a bandwidth-agnostic manner such that it contains a common central portion in a predetermined frequency band that is independent of a bandwidth utilized by an associated wireless communication system. The central portion can be constructed as a two-dimensional block in time and frequency that spans a default cell search bandwidth, a predetermined bandwidth specified by synchronization codes or other signals, or another suitable bandwidth. A reference signal can then be constructed form the central portion by tiling or expanding the central portion such that it spans the entire system bandwidth.

46 Claims, 14 Drawing Sheets

Related U.S. Application Data division of application No. 12/443,961, filed as application No. PCT/US2007/083267 on Oct. 31, 2007, now Pat. No. 8,848,599.

(60) Provisional application No. 60/863,965, filed on Nov. 1, 2006.

(51) Int. Cl.
*H04J 11/00* (2006.01)
*H04L 5/00* (2006.01)
*H04J 3/06* (2006.01)
*H04W 48/08* (2009.01)

(52) U.S. Cl.
CPC .. *H04B 2201/70701* (2013.01); *H04L 5/0023* (2013.01); *H04L 5/0037* (2013.01); *H04W 48/08* (2013.01); *Y02D 70/00* (2018.01); *Y02D 70/1222* (2018.01); *Y02D 70/1262* (2018.01); *Y02D 70/25* (2018.01)

(56) References Cited

U.S. PATENT DOCUMENTS

| | | | |
|---|---|---|---|
| 8,837,380 | B2 | 9/2014 | Montojo et al. |
| 8,848,599 | B2 | 9/2014 | Montojo et al. |
| 2004/0023918 | A1 | 2/2004 | Monia et al. |
| 2004/0023919 | A1 | 2/2004 | Ohsawa et al. |
| 2005/0128993 | A1 | 6/2005 | Yu et al. |
| 2005/0195910 | A1 | 9/2005 | Kim et al. |
| 2005/0243940 | A1 | 11/2005 | Huh et al. |
| 2005/0286402 | A1 | 12/2005 | Byun et al. |
| 2006/0039451 | A1 | 2/2006 | Zhuang et al. |
| 2006/0114812 | A1 | 6/2006 | Kim et al. |
| 2006/0291431 | A1 | 12/2006 | Pajukoski et al. |
| 2007/0041348 | A1 | 2/2007 | Kwun et al. |
| 2007/0076668 | A1 | 4/2007 | Tirkkonen et al. |
| 2007/0183391 | A1 | 8/2007 | Akita et al. |
| 2007/0248113 | A1 | 10/2007 | Ko et al. |
| 2008/0045260 | A1 | 2/2008 | Muharemovic et al. |
| 2008/0318527 | A1* | 12/2008 | Higuchi .............. H04B 1/707 455/42 |
| 2009/0219802 | A1* | 9/2009 | Han .................... H04L 5/14 370/210 |
| 2009/0225704 | A1 | 9/2009 | Lee et al. |
| 2009/0274112 | A1* | 11/2009 | Ma .................... H04L 1/06 370/330 |
| 2014/0362818 | A1 | 12/2014 | Onggosanusi et al. |
| 2014/0364117 | A1 | 12/2014 | Montojo et al. |

FOREIGN PATENT DOCUMENTS

| | | |
|---|---|---|
| KR | 20050059179 A | 6/2005 |
| RU | 2157548 C1 | 10/2000 |
| RU | 2252429 C2 | 5/2005 |
| TW | I244277 | 11/2005 |
| TW | I244847 | 12/2005 |
| WO | WO1992010890 | 6/1992 |
| WO | WO9848294 A1 | 10/1998 |
| WO | WO0001127 A1 | 1/2000 |
| WO | WO2002005506 | 1/2002 |
| WO | WO2006023423 A2 | 3/2006 |
| WO | WO2006104482 A1 | 10/2006 |
| WO | WO2006104482 A1 | 11/2007 |
| WO | WO2007135733 A1 | 11/2007 |

OTHER PUBLICATIONS

Huawei: "Cell-specific integer sequences for frequency positioning of DL RS on subframe basis" 3G-PP Draft; R1-070532, 3rd Generation Partnership Project (3GPP), Mobile Competence Centre ; 650, Route.Des Lucioles ; F-06921 Sophia-Antipolis Cedex ; France, vol. RAN WG1, no. Sorrento, Italy; Jan. 15, 2007, Jan. 12, 2007 (Jan. 12, 2007), XP050104558 p. 1, line 1-p. 2, line 22 p. 4, line 1-p. 5, line 12.

Huawei: "Frequency-Shifting or Frequency-Hopping of DL Reference Symbols: Implications to Cell Search and Through Put Performance" [Online] No. R1-063032, Riga, Latvia, (Nov. 6, 2006)-(Nov. 10, 2006), XP002480599.

Huawei: "Large Sets of FH Pilot Patterns" [Online] 3GPP TSG RAN WG1 LTE Ad Hoc,No. R1-060224, XP002480596, Helsinki, Finland (Jan. 23, 2006)-(Jan. 25, 2006).

International Search Report—PCT/US07/083267, International Search Authority-European Patent Office—dated Jun. 12, 2008.

LG Elecronics: "LGE's Views on the Various Aspects of Downlink Reference Signal Design" [Online] No. R1-062561, pp. 1-6 Seoul Korea, (Oct. 9, 2006)-(Oct. 13, 2006), XP002480598.

NTT Docomo: "Neighbouring Cell Search Method for Connected and Idle Mode in E-UTRA Downlink", 3GPP TSG-RAN WG1#45 R1-061188, May 8, 2006, pp. 1-8, URL: http://www.3gpp.org/ftp/tsg_ran/WG1_RL1/TSGR1_45/Docs/R1-061188.zip.

NTT Docomo: "Physical Channel Concept for Scalable Bandwith in Evolved UTRA Downlink" 3GPP TSG RAN WG1 Ad Hoc on LTE, [Online] No. R1-050592, pp. 1-14, Sophia Antipolis, France, (Jun. 20, 2005)-(Jun. 21, 2005), XP002482057.

NTT DoCoMo,"SCH Structure and Cell Search Method for E-UTRA Downlink[online]" 3GPP TSG-RAN WG1#45 R1-061186, <URL:http://www.3gpp.org/ftp/tsg_ran/WG1_RL1/TSGR1_45/Docs/R1-061186.zip>, May 8, 2006, pp. 1-13.

Taiwan Search Report—TW096141221—TIPO—dated Jul. 1, 2011.

Written Opinion—PCT/US07/083267, International Search Authority—European Patent Office—dated Jun. 12, 2008.

ZTE, RITT: "Reference Signal Sequence Design for ETURA Downlink" 3GPP TSG-RAN WG1 Adhoc Meeting on LTE, [Online] No. R1-061760, p. 1-7, Cannes, France, (Jun. 27, 2006)-(Jun. 30, 2006), XP002482058.

U.S. Appl. No. 07/624,118, filed Dec. 7, 1990, Gilhousen; Klein S.

* cited by examiner

REFERENCE SIGNAL DESIGN FOR CELL SEARCH IN AN ORTHOGONAL WIRELESS COMMUNICATION SYSTEM

CROSS-REFERENCE

This application is a continuation of U.S. patent application Ser. No. 14/469,205, filed Aug. 26, 2014, entitled "Reference Signal Design for Cell Search in an Orthogonal Wireless Communication System," which is a divisional of U.S. patent application Ser. No. 12/443,961, filed Oct. 6, 2009, entitled "Reference Signal Design For Cell Search In An Orthogonal Wireless Communication System," which is a national phase of International Patent Application No. PCT/US2007/083267, filed Oct. 31, 2007, entitled "Reference Signal Design For Cell Search In An Orthogonal Wireless Communication System," which claims the priority benefit of U.S. Provisional Application Ser. No. 60/863,965, filed Nov. 1, 2006, entitled "A Method And Apparatus For Cell Search In An Orthogonal Wireless Communication System," each of which are incorporated herein by reference.

FIELD OF THE DISCLOSURE

The present disclosure relates generally to wireless communications, and more specifically to techniques for performing cell search in a wireless communication system.

BACKGROUND

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

When a terminal enters the coverage area of a wireless communication system, is powered on, or otherwise initially becomes active in a system, the terminal is often required to engage in an initial cell search procedure to become operational in the system. During a cell search procedure, a terminal typically performs time and frequency synchronization with the system. Further, a terminal typically identifies a cell in which the terminal is located and other critical system information, such as bandwidth and transmitter antenna configurations.

Cell search is often conducted in wireless communication systems through the use of synchronization and/or reference signals. However, various features of systems such as third generation long term evolution (3G LTE) systems and evolution universal terrestrial radio access (E-UTRA) systems, such as the presence of a cyclic prefix to mitigate inter-symbol interference in orthogonal frequency division multiplexing and downlink system bandwidth versatility, can complicate the construction of synchronization and/or reference signals in a manner that is efficient and reliable. Accordingly, there exists a need for cell acquisition procedures that maximize overall system speed and reliability while minimizing required resources.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

According to an aspect, a method for constructing a reference signal in a wireless communication system is described herein. The method can comprise generating a central portion for a reference signal, the central portion spans a frequency band that is known to a terminal to which the reference signal is to be transmitted and is a subset of a total system bandwidth; and generating a reference signal based on the generated central portion such that the reference signal spans the total system bandwidth.

Another aspect relates to a wireless communications apparatus that can comprise a memory that stores data relating to a system bandwidth and a subset of the system bandwidth known to a user device. The wireless communications apparatus can further comprise a processor configured to generate a reference signal having a common portion centered on the subset of the system bandwidth known to the user device to facilitate detection of the reference signal at the user device independent of the system bandwidth.

Yet another aspect relates to an apparatus that facilitates cell acquisition in a wireless communication system. The apparatus can comprise means for generating a reference signal for transmission to a terminal at least in part by generating a common section of the reference signal over a frequency band known to the terminal within a system bandwidth and performing an operation selected from the group consisting of copying the common section of the reference signal over the system bandwidth and extending the common portion of the reference signal over the system bandwidth; and means for transmitting the reference signal to the terminal over the system bandwidth.

Still another aspect relates to a computer-readable medium, which can comprise code for causing a computer to generate a reference signal, the reference signal spanning a system bandwidth and having a common portion centered on a subset of the system bandwidth known to a terminal to facilitate detection of the reference signal at the terminal independent of the system bandwidth; and code for causing a computer to transmit the reference signal to the terminal over the system bandwidth.

According to another aspect, an integrated circuit is described herein that can execute computer-executable instructions for designing a reference signal for use in cell acquisition. The instructions can comprise constructing a common signal that spans a frequency band known to a user device, the frequency band known to the user device is a subset of a system bandwidth; and constructing a reference signal at least in part by performing an operation selected from the group consisting of tiling the common signal in frequency over the system bandwidth and extending the common signal across the system bandwidth, the operation enables bandwidth-agnostic detection of the reference signal by the user device.

According to yet another aspect, a method for performing cell acquisition in a wireless communication system is described herein. The method can comprise identifying a known frequency band, the known frequency band is a subset of a total system bandwidth; and detecting a reference signal that spans the total system bandwidth at least in part by receiving a central portion of the reference signal that spans the known frequency band.

According to a further aspect, a wireless communications apparatus is described herein that can comprise a memory that stores data relating to a known subset of a system bandwidth. The wireless communications apparatus can further comprise a processor configured to detect a reference signal that spans the system bandwidth at least in part by detecting a portion of the reference signal that spans the known subset of the system bandwidth.

Another aspect relates to an apparatus that facilitates detection of a reference signal for cell acquisition in a wireless communication system. The apparatus can comprise means for receiving one or more synchronization codes on a first frequency band; means for determining whether the synchronization codes comprise information relating to a second frequency band; and means for receiving a reference signal centered on a frequency band selected from the group consisting of the first frequency band and the second frequency band, the frequency band is selected based at least in part on the determination of whether the synchronization codes comprise information relating to the second frequency band.

Yet another aspect relates to a computer-readable medium, which can comprise code for causing a computer to identify a frequency band on which a reference signal can be transmitted, the identified frequency band is a subset of a total system bandwidth; and code for causing a computer to detect a reference signal that spans the system bandwidth and is centered on the identified frequency band.

Still another aspect relates to an integrated circuit that executes computer-executable instructions for performing cell search in a wireless communication system. The instructions can comprise determining a known set of frequency resources within a system bandwidth; and receiving a reference signal that occupies the system bandwidth at least in part by detecting a portion of the reference signal that is centered on the known set of frequency resources.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

DETAILED DESCRIPTION

Figure 1:
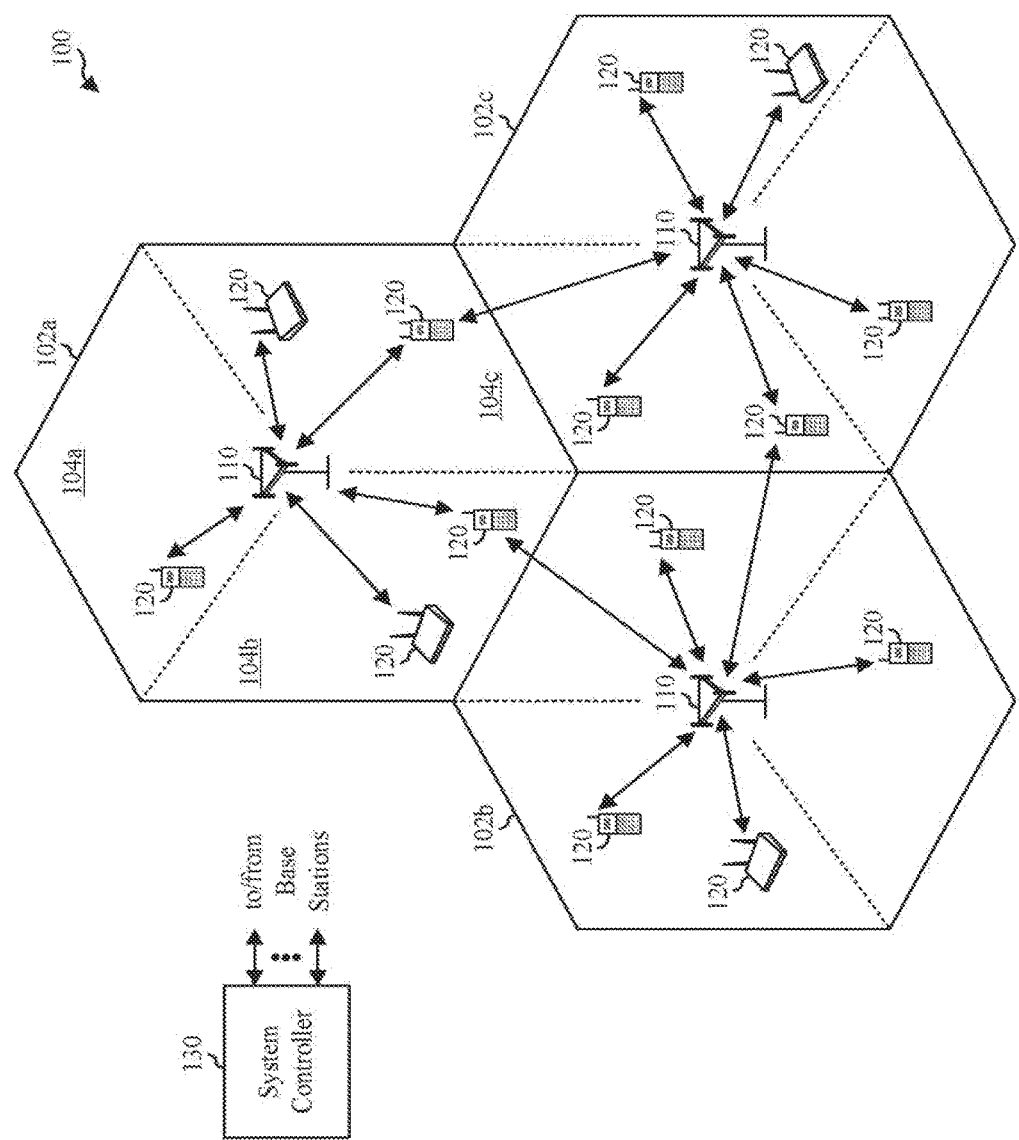
FIG. 1 illustrates a wireless multiple-access communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 may be an access point, a Node B (e.g., an Evolved Node B or eNB), and/or another appropriate network entity. Each base station 110 provides communication coverage for a particular geographic area 102. As used herein and generally in the art, the term "cell" can refer to a base station 110 and/or its coverage area 102 depending on the context in which the term is used.

To improve system capacity, the coverage area 102 corresponding to a base station 110 may be partitioned into multiple smaller areas (e.g., areas 104a, 104b, and 104c). Each of the smaller areas 104a, 104b, and 104c may be served by a respective base transceiver subsystem (BTS, not shown). As used herein and generally in the art, the term "sector" can refer to a BTS and/or its coverage area depending on the context in which the term is used. Further, as used herein and generally in the art, the term "cell" can also be used to refer to the coverage area of a BTS depending on the context in which the term is used. In one example, sectors 104 in a cell 102 can be formed by groups of antennas (not shown) at base station 110, where each group of antennas is responsible for communication with terminals 120 in a portion of the cell 102. For example, a base station 110 serving cell 102a may have a first antenna group corresponding to sector 104a, a second antenna group corresponding to sector 104b, and a third antenna group corresponding to sector 104c. However, it should be appreciated that the various aspects disclosed herein may be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein may refer both to a station that serves a sector as well as a station that serves a cell.

In accordance with one aspect, terminals 120 may be dispersed throughout the system 100. Each terminal 120 may be stationary or mobile. By way of non-limiting example, a terminal 120 may be an access terminal (AT), a mobile station, user equipment (UE), a subscriber station, and/or another appropriate network entity. A terminal 120 may be a wireless device, a cellular phone, a personal digital assistant (PDA), a wireless modem, a handheld device, or another appropriate device. Further, a terminal 120 may communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 may be a single network entity or a collection of network entities. Additionally, the system 100 may utilize a distributed architecture to allow the base stations 110 to communicate with each other as needed. In one example, system controller 130 can additionally contain one or more connections to multiple networks. These networks may include the Internet, other packet based networks, and/or circuit switched voice networks that may provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler may reside in each individual cell 102, each sector 104, or a combination thereof.

In one example, system 100 may utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which may be modulated with data. Typically, modulation symbols are sent in the frequency domain with OFDM and in the time domain with SC-FDM. Additionally and/or alternatively, the system bandwidth can be divided into one or more frequency carriers, each of which may contain one or more subcarriers. System 100 may also utilize a combination of multiple-access schemes, such as OFDMA and CDMA.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing.

Figure 2:
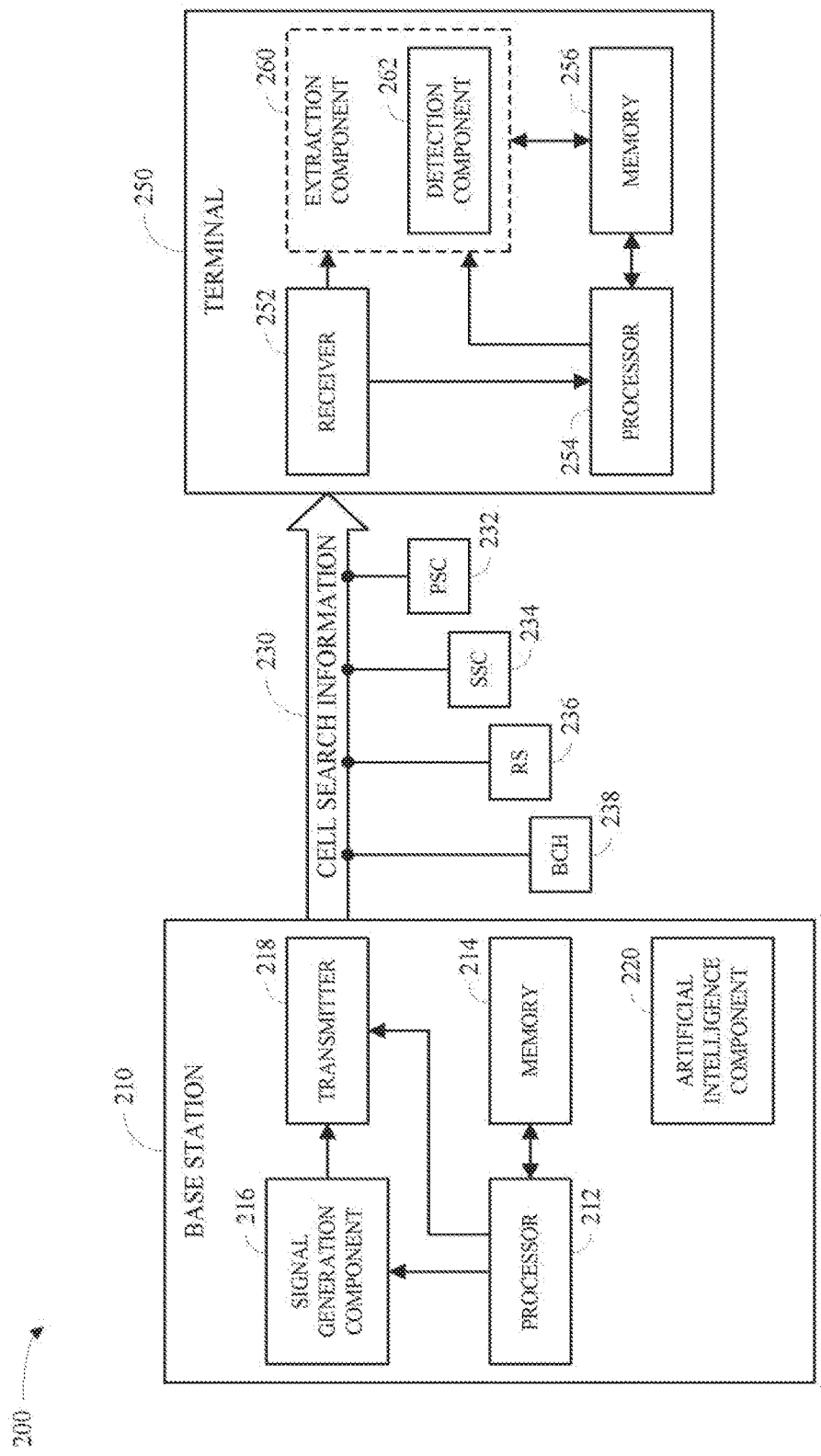
FIG. 2 illustrates an example system that facilitates cell search in a wireless communication system in accordance with various aspects.

FIG. 2 is a block diagram of an example system 200 that provides cell search functionality in a wireless communication system in accordance with various aspects set forth herein. System 200 can include one or more base stations 210 and one or more terminals 250, which can communicate with each other on forward and reverse links using one or more wireless communication protocols.

In accordance with one aspect, when a terminal 250 is powered on, enters an active state from an idle state, moves into the coverage area of a base station 210, or otherwise obtains the ability to communicate in system 200, the terminal 250 can conduct cell acquisition to become operational in system 200. Upon initially entering system 200, a terminal 250 may not be aware of parameters necessary for communication in system 200, such as timing of system 200, frequency resources utilized within system 200, the bandwidth of system 200, which base stations 210 in system 200 are transmitting, and/or other parameters. Thus, to become operational in system 200, terminal 250 can obtain these parameters and/or other necessary information for communication through a cell search or cell acquisition procedure with, for example, a base station 210.

In one example, a terminal 250 can perform timing synchronization with system 200 and/or base station 210 during a cell acquisition procedure to obtain parameters such as symbol boundaries, frame and subframe boundaries, broadcast channel transmission time interval (TTI) boundaries, and/or other timing parameters utilized by system 200. Further, a terminal 250 can perform frequency synchronization with system 200 and/or base station 210 during cell search to acquire, for example, a carrier frequency utilized for downlink transmission so that it can be used as a frequency reference for uplink transmissions. A terminal 250 can additionally acquire other system information necessary for communication in system 200 during cell acquisition, such as the identity of base station 210 and/or a cell within a coverage area of base station 210 that services an area in which terminal 250 is located, system bandwidth, antenna configurations used at base station 210 and/or cells within base station 210, cyclic prefix (CP) durations utilized within system 200, and/or other parameters.

In another example, system parameters can be provided to terminal 250 during cell search by base station 210 via cell search information signaling 230. This signaling can include, for example, a primary synchronization code (PSC) 232, a second synchronization code (SSC) 234, a reference signal (RS) 236, and a broadcast channel (BCH) 238. Various structures in which signaling 230 can be transmitted, as well as various functions that signaling 230 can perform, are described in more detail infra.

Base station 210 can include a processor, which can work alone or in combination with a signal generation component 216 to generate and prepare the cell search information signaling 230 for transmission to terminal 250 via a transmitter 218. Processor 212 can additionally interact with memory 214. In one example, processor 212 and/or signal generation component 216 at base station 210 can construct cell search information signaling 230 based on timing synchronization, frequency synchronization, and/or other system parameters. These parameters can be embedded by base station 210 into individual signals 232-238 and/or combinations of signals.

Base station 210 can also include an artificial intelligence (AI) component 220. The term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithm, and reinforced learning—to a set of available data (information) on the system. In particular, AI component 220 can employ one of numerous methodologies for learning from data and then drawing inferences from the models so constructed, e.g., hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches (that perform data fusion, etc.) in accordance with implementing various automated aspects described hereinafter.

In accordance with another aspect, cell search information signaling 230 and/or other signals can then be received by terminal 250 via a receiver 252. These signals can then be provided to a processor 254 and/or an extraction component 260 to allow terminal 250 to perform cell acquisition based on the received information. In one example, extraction component 260 can extract system parameters from the cell search information 230, thereby allowing terminal 250 to become operational in system 200. Further, processor 254 and/or extraction component 260 can interact with memory 256. Additionally and/or alternatively, terminal 250 can further include an AI component (not shown) that can operate in a similar manner to AI component 220 at base station 210 to facilitate automation of terminal 250.

Extraction component 260 can further include a detection component 262, which can determine whether signaling received by extraction component 260 contains one or more cell search information signals 232-238. By way of example, detection component 260 can perform coherent detection for a signal, such as RS 236, over a modulation symbol or a predetermined time period by utilizing channel information obtained from another signal, such as PSC 232 and/or SSC 234, to locate RS 236 in frequency. Alternatively, detection component 260 can perform non-coherent detection for a signal over a modulation symbol or time period by directly summing the signal in the frequency domain over the symbol or time period. Based on results obtained from coherent and/or non-coherent detection over given symbols and/or time periods, detection of a given signal can be completed by performing coherent and/or non-coherent combining over a series of symbols and/or time periods.

Figure 3:
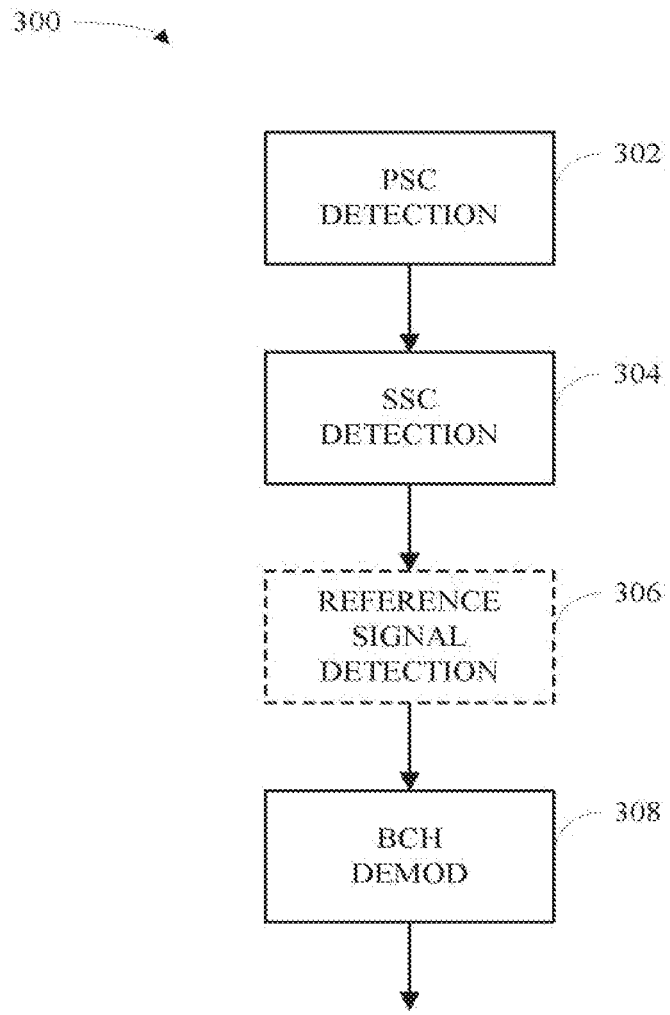
FIG. 3 illustrates an example cell search procedure that can be utilized in a wireless communication system in accordance with various aspects.

FIG. 3 is a diagram that illustrates an example cell search procedure 300 that can be utilized in a wireless communication system (e.g., system 200) in accordance with various aspects. In one example, a terminal (e.g., terminal 250) can conduct cell search procedure 300 to obtain parameters necessary for communication in a wireless communication system. Procedure 300 can start by detecting a primary synchronization code (PSC), as illustrated by block 302. A PSC detected at block 302 can be transmitted on, for example, a primary synchronization channel (P-SCH). Further, a PSC can be common to a wireless communication system or can be individually tailored by entities in the system (e.g., base stations 210) to convey system parameters as discussed in more detail infra. Additionally, a PSC detected as illustrated by block 302 can be utilized to obtain rough timing information for a system, such as OFDM symbol, slot, and subframe time boundaries and/or other suitable timing information.

Once a PSC has been detected as illustrated by block 302, a secondary synchronization code (SSC) can then be detected, as illustrated by block 304. A SSC can be transmitted on, for example, a secondary synchronization channel (S-SCH). In one example, a sequence used for a SSC can be chosen from a group of possible sequences and can be used to convey a cell ID or a cell group ID corresponding to an entity that transmits the SSC. In addition, a SSC can be used to provide additional timing synchronization to supplement information provided in a corresponding PSC. For example, a SSC can be used to convey half radio-frame and radio-frame time boundaries. Further, like a PSC, a SSC can be individually tailored by entities in a system to convey system parameters as discussed in more detail infra.

After a PSC and SSC are detected as illustrated at blocks 302 and 304, a reference signal (RS) can then optionally be detected as illustrated by block 306. A reference signal can be constructed using, for example, pilot tones transmitted in a given pattern in time and frequency. A reference signal can be used to convey a cell ID in the event that a SSC provides only a cell group ID. In addition, a reference signal can be used to provide other system parameters as discussed in further detail infra. Procedure 300 can then continue as illustrated at block 308 by demodulating signals received over a broadcast channel (BCH), such as a primary broadcast channel (P-BCH). Signals received over the broadcast channel can include further information regarding the system and/or an entity transmitting over the broadcast channel.

In accordance with one aspect, a system in which procedure 300 is performed may be capable of multiple bandwidths (e.g., 1.25 MHz, 1.6 MHz, 2.5 MHz, 5 MHz, 10 MHz, 15 MHz, 20 MHz, etc.). Thus, to allow a terminal to perform cell acquisition irrespective of a bandwidth used by the system, signals in procedure 300 can be transmitted over a common frequency band that is agnostic to the system bandwidth. For example, signals used in procedure 300 can be transmitted over a frequency band spanning 1.08 MHz, 1.25 MHz, or any other appropriate bandwidth.

In accordance with another aspect, a PSC and/or SSC detected at blocks 302 and 304 of cell search procedure 300 can be constructed to include system information in order to aid a terminal in detecting a reference signal and/or a broadcast channel at blocks 306 and 308. For example, a PSC and/or SSC can be configured to include information regarding a number of transmit antennas present at a cell from which the codes are transmitted. In one example, a reference signal can comprise a series of pilot tones that are transmitted in a set pattern in time and frequency based on the number of transmit antennas used to transmit the signal. Accordingly, knowledge of the number of transmit antennas used to transmit the reference signal prior to receiving the reference signal can allow a terminal to use the energy of the pilot tones present in the reference signal to aid in its detection. Information regarding number of transmit antennas can be embedded in a PSC and/or SSC by varying the time location of a PSC within a radio frame, varying a sequence used for a PSC and/or SSC, and/or by any other appropriate means.

As another example, a PSC and/or SSC can be configured to convey information regarding a number of sectors served by a given Node B (e.g., a base station 210). Reference signals for sectors within a cell served by a Node B can, for example, be multiplexed using code division multiplexing (CDM) to share time and/or frequency resources. Therefore, knowledge of the number of sectors served by a Node B prior to detection of a reference signal can additionally improve detection performance. In one example, information regarding the number of sectors served by a Node B can be embedded into a PSC and/or SSC in a similar manner to information regarding the number of transmit antennas at a cell.

As an additional example, information regarding system bandwidth can be embedded into a PSC and/or SSC. In one example, a system can be capable of operation under multiple bandwidths; consequently, a terminal performing cell acquisition via procedure 300 may not initially be aware of the bandwidth employed by a system. Because of this, a PSC, SSC, and/or other cell acquisition signals can be transmitted on a common frequency band for cell acquisition. However, if information regarding system bandwidth is provided prior to detection of a reference signal and/or demodulation of signals over a broadcast channel as illustrated by blocks 306 and 308, reference signals and/or the broadcast channel can be made able to use bandwidth beyond the common frequency band for cell acquisition. As a result, more information will be capable of transmission via the reference signal and/or broadcast channel, which can result in faster and more effective cell acquisition. A PSC and/or SSC can be configured to provide a precise bandwidth utilized by the system. Alternatively, a bandwidth can be specified within a range (e.g., whether the system bandwidth is less than, equal to, or greater than a reference bandwidth). Information regarding system bandwidth can be embedded into a PSC and/or SSC in a similar manner to information regarding transmit antennas and/or sectors served by a Node B. Further, techniques for transmitting a reference signal for various system bandwidth and synchronization code configurations are described in more detail infra.

Figure 4:
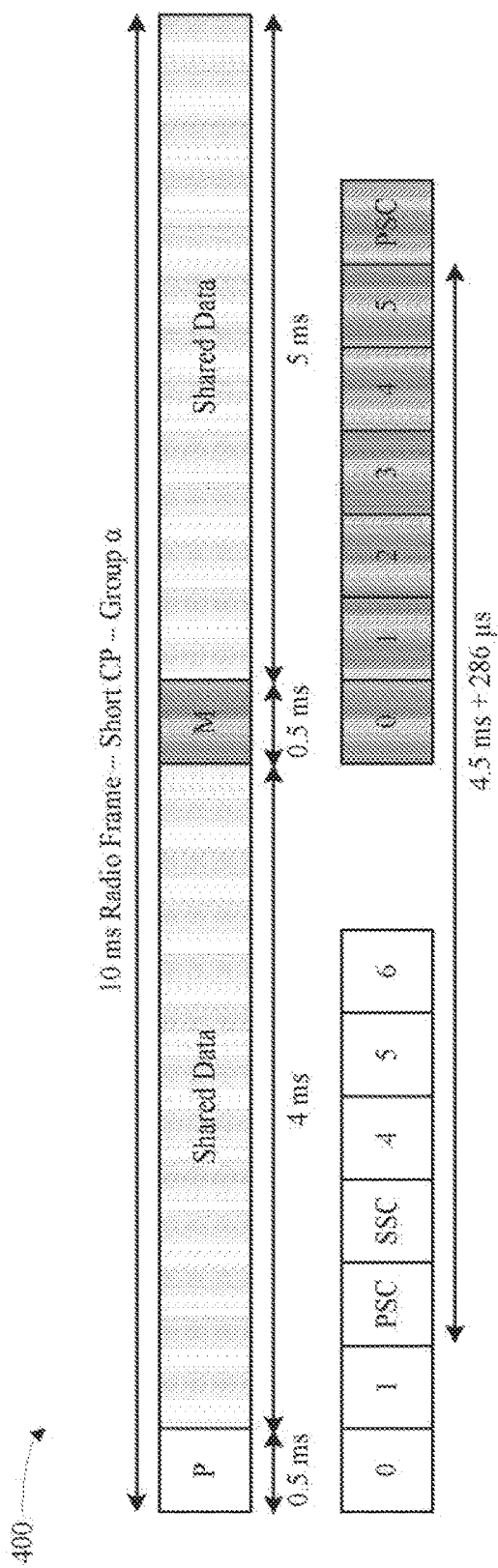
FIG. 4 illustrates an example transmission structure that can be utilized to transmit synchronization codes in a wireless communication system.

FIG. 4 illustrates an example transmission structure 400 that can be utilized to transmit synchronization codes (e.g., PSC 232 and SSC 234) in a wireless communication system (e.g., system 200). Transmission structure 400 illustrates an example structure for a downlink frame that can be utilized in a wireless communication system. As illustrated by structure 400, a frame can be arranged as a series of slots in time, one or more of which can be used for transmission of signaling and/or shared data. In one example, a cyclic prefix utilized by a wireless communication system to mitigate interference resulting from OFDM can be determined by a terminal during cell search based on information provided in one or more subframes in a downlink frame such as the frame illustrated by structure 400.

Structure 400 illustrates one example of locations in time in which a PSC and SSC can be transmitted. In accordance with one aspect, unless corresponding PSC and SSC sequences are located close in time and frequency, a SSC can not be detected coherently using the PSC as a phase reference. As a result, constraints can exist on a type of sequence that can be used for the SSC and, therefore, on the number of different SSC sequences that can be utilized. In general, it should be appreciated that a transmission structure that allows coherent detection of SSC enables a large number of SSC sequences to be utilized, while a transmission structure that allows only non-coherent detection of SSC limits the number of SSC sequences that can be utilized to a small number.

In accordance with another aspect, in a synchronous system, transmission structure 400 can be replicated from cell to cell. Therefore, if PSC and SSC locations within a radio frame are fixed, PSCs that are the same as those utilized by other cells can experience a "single frequency network" (SFN) channel. As a result, a mismatch can be present between the phase of the cell-specific SSC and the cell common-PSC. Because of this, various signal detection techniques can be utilized. For example, a SSC can be non-coherently detected such that corresponding PSC is not used for detection of the SSC. Additionally and/or alternatively, multiple PSCs can be used in the system as opposed to a single common PSC.

Figure 5A:
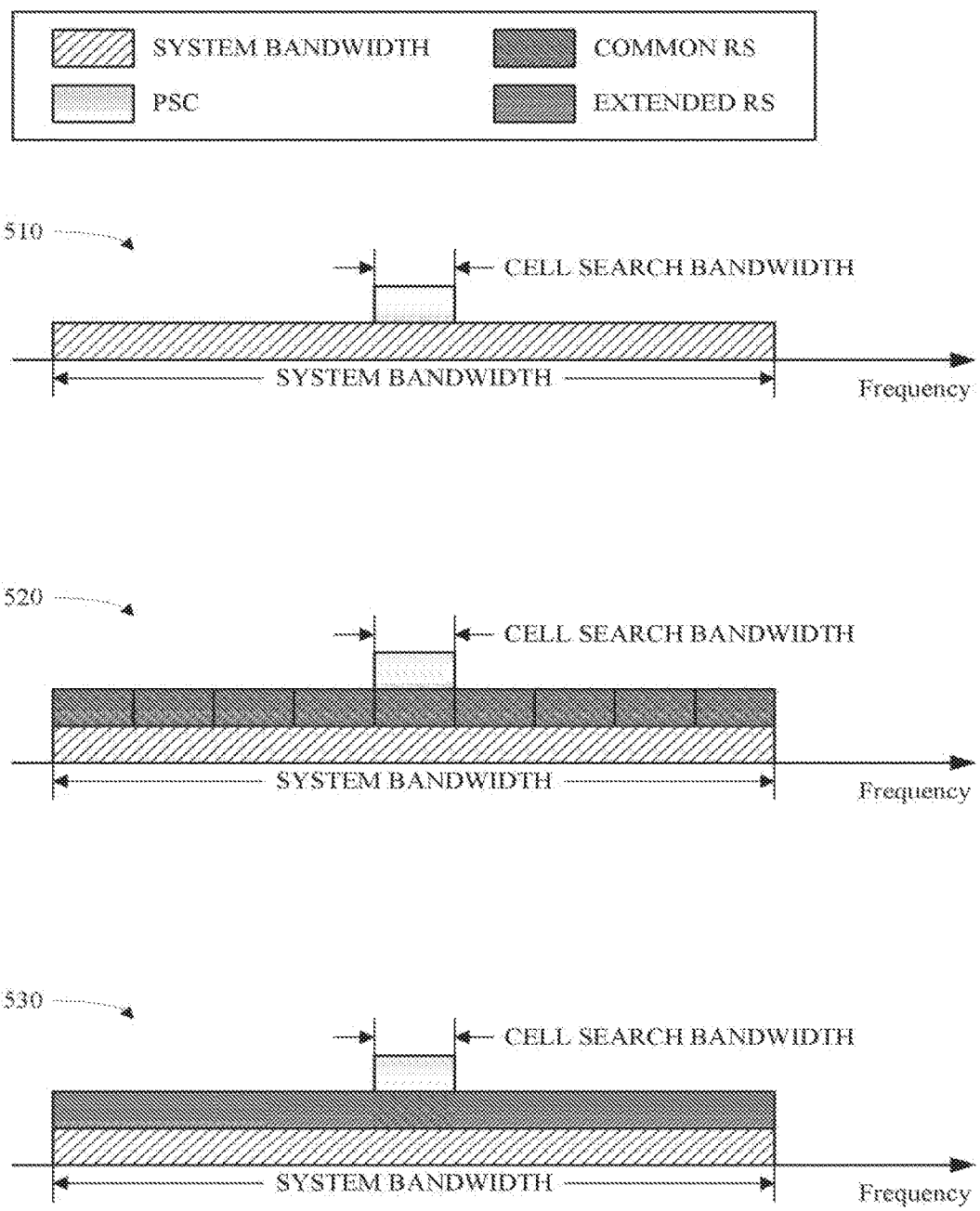
FIGS. 5A-5B illustrate techniques for constructing and transmitting a reference signal in accordance with various aspects.
Figure 5B:
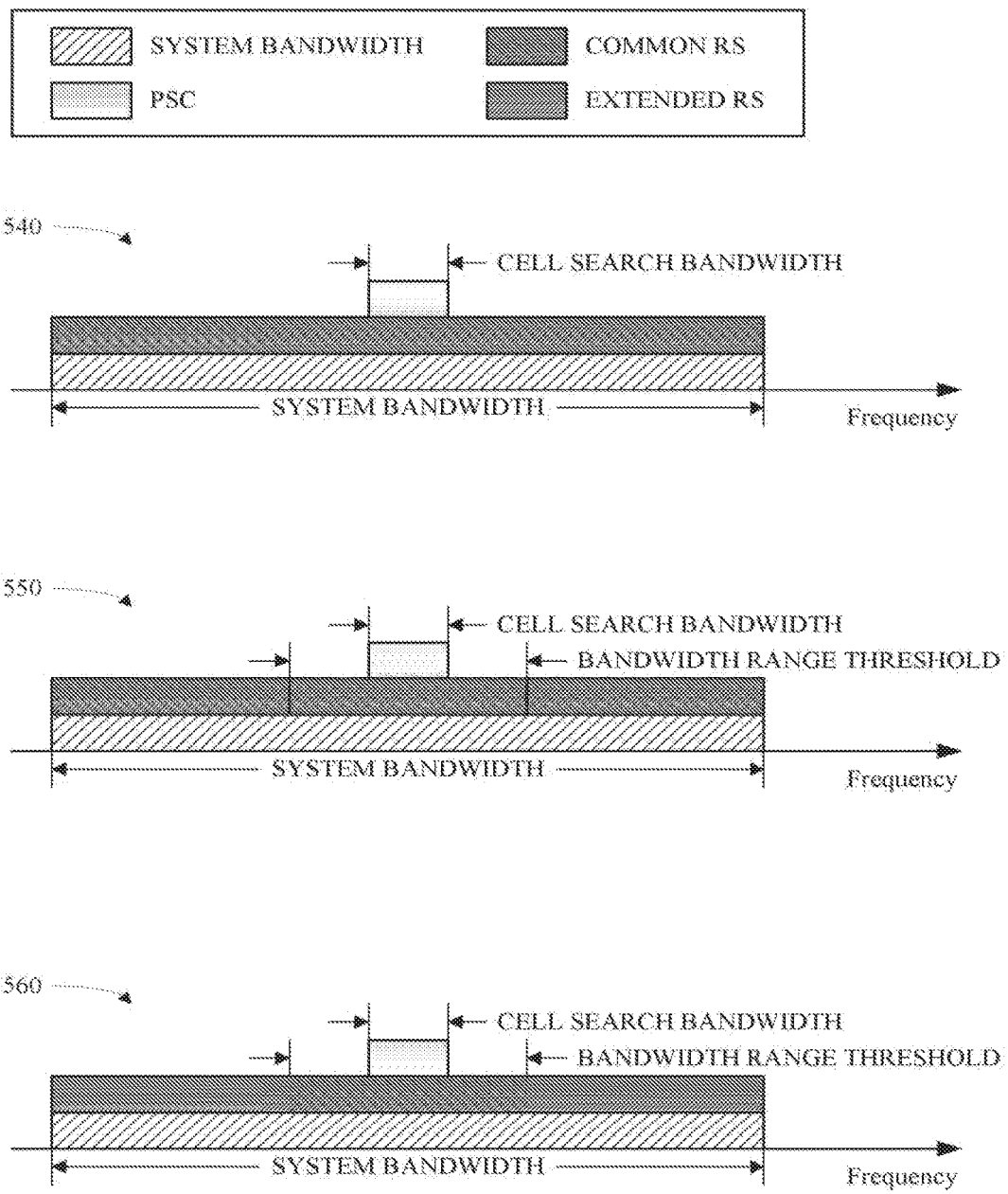

With reference to FIGS. 5A-5B, various techniques for constructing and transmitting a reference signal (e.g., RS 236) are illustrated by way of diagrams 510-560. It should be appreciated that diagrams 510-560 are provided merely for illustrative purposes and are not drawn to scale. Further, no specific proportions between bandwidths illustrated by diagrams 510-560 are intended to be conveyed, either explicitly or implicitly, from the relative sizes of objects illustrated in diagrams 510-560.

In accordance with one aspect, diagram 510 in FIG. 5A illustrates a cell search bandwidth that can be used for transmission of a PSC (e.g., PSC 232) as compared to the overall bandwidth of a wireless communication system (e.g., system 200) in which the PSC is transmitted. In one example, such a wireless communication system can be capable of operation in multiple bandwidths. As a result, a user equipment device (UE) may not initially be aware of the bandwidth of the system. To facilitate initial cell acquisition despite the fact that a given UE is not aware of the system bandwidth, a PSC can be transmitted over a default cell search bandwidth. As illustrated in diagram 510, the PSC can be centrally positioned in the system bandwidth and can occupy a bandwidth of a size that is sufficient to ensure support irrespective of the bandwidth of the system.

Similarly, unless system bandwidth information is provided prior to detection of a reference signal as illustrated at block 306 of procedure 300, a UE can again utilize the common cell search bandwidth for detection of the reference signal. While a UE can obtain information relating to timing and frequency synchronization and/or other system parameters from a PSC and/or SSC at blocks 302-304 of procedure 300 to enable the UE to become operational in the system, the UE may still not be aware of the system bandwidth at the time a reference signal is to be detected unless system bandwidth information is provided in the PSC and/or SSC. However, reference signals are often uniquely defined for a given system bandwidth to span the entire bandwidth. As a result, a UE can be required to test multiple hypotheses corresponding to possible system bandwidths to detect the reference signal if it is not aware of the system bandwidth prior to detection. Accordingly, a reference signal can be constructed in a bandwidth-agnostic manner such that it contains a common central portion in a predetermined frequency band regardless of the system bandwidth. By doing so, a UE can detect a reference signal defined for the overall bandwidth of the system without requiring knowledge of said bandwidth.

Diagram 520 illustrates one technique that can be utilized to construct a reference signal that is independent to system bandwidth in accordance with various aspects when bandwidth information is not provided prior to transmission of the reference signal. As illustrated by diagram 520, a common portion of a reference signal can be built as a two-dimensional matrix in time and frequency. This portion, which can also be referred to as a "periodic block" or any other suitable nomenclature, can then be centered at a common cell search bandwidth for the system. As further illustrated in diagram 520, the reference signal can then be transmitted by repeating the common periodic block such that the reference signal spans the system bandwidth.

Alternatively, diagram 530 illustrates another technique that can be utilized to construct a reference signal in a bandwidth-agnostic manner when bandwidth information is not known to a UE prior to reference signal detection. As illustrated by diagram 530, a bandwidth-independent portion of a reference signal can be built as a 2-dimensional matrix in time and frequency and centered at a common cell search bandwidth in a similar manner to that illustrated in diagram 520. Next, extensions can be provided for the common portion of the reference signal to expand the reference signal such that it spans the system bandwidth. By using the techniques illustrated by diagrams 520-530 in FIG. 5A, a portion of the reference signal placed in a common cell search frequency band can appear the same to a UE regardless of system bandwidth.

Similarly, FIG. 5B illustrates techniques for constructing and transmitting a reference signal in the event that complete or partial bandwidth information is provided prior to reference signal detection. In accordance with one aspect, diagram 540 illustrates a scenario where complete bandwidth information is provided to a UE prior to reference signal detection. In such a case, the reference signal can span the entire system bandwidth without requiring the UE to test bandwidth hypotheses due to the fact that the UE already has complete knowledge of the system bandwidth.

Alternatively, diagrams 550 and 560 illustrate techniques that can be employed in a scenario where only partial bandwidth information is provided to a UE prior to reference signal detection. For example, a UE can be informed that the system bandwidth is within a given range in relation to a bandwidth range threshold. In such an example, if the system bandwidth is less than the bandwidth range threshold, a reference signal can be centered on a common cell search frequency band and transmitted as illustrated in diagrams 520-530 of FIG. 5A. Otherwise, if the system bandwidth is greater than or equal to the threshold, the UE can infer that the system bandwidth is at least as large as the threshold. Accordingly, the bandwidth range threshold can be used for transmission of the reference signal instead of the common cell search frequency band in order to allow more information to be conveyed in the reference signal and/or in subsequent broadcast channel transmissions. In one example, a common portion of a reference signal can be constructed and centered on a bandwidth equal to the range threshold. This central portion can then be duplicated as illustrated in diagram 550 or extended as illustrated in diagram 560 to span the entire system bandwidth in a similar manner to diagrams 520 and 530.

Figure 6A:
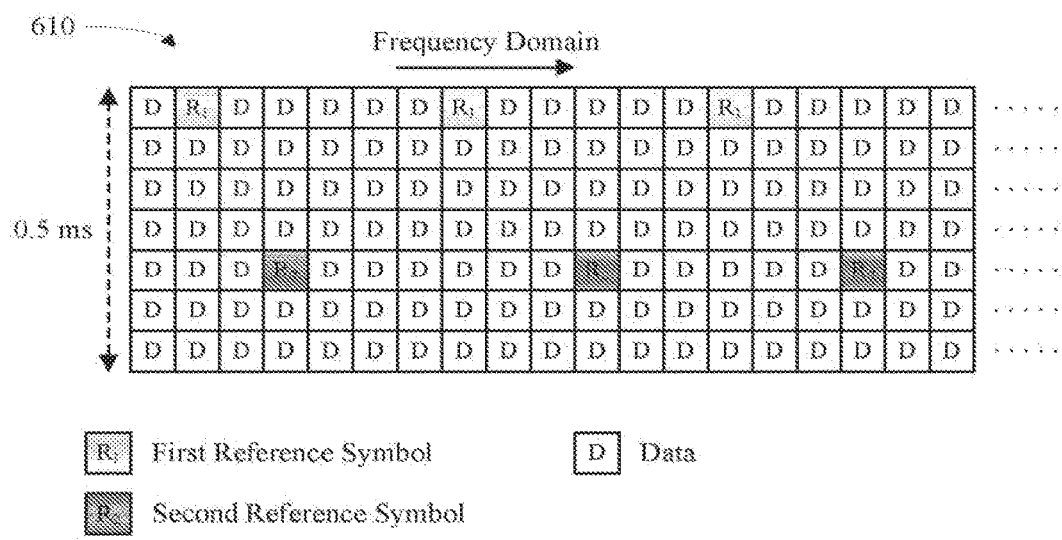
FIGS. 6A-6C illustrate example reference signal structures that can be utilized for cell search in accordance with various aspects.
Figure 6B:
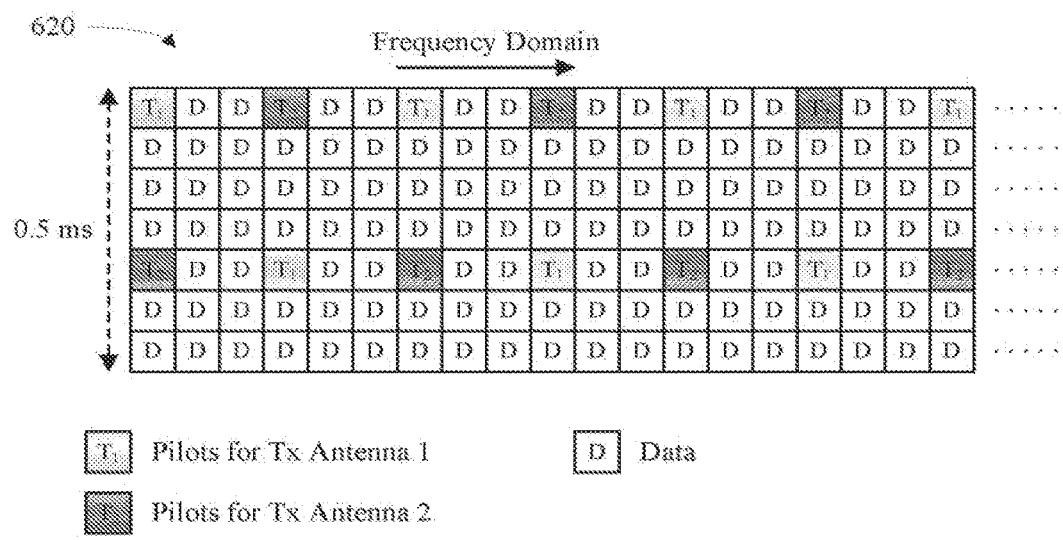
Figure 6C:
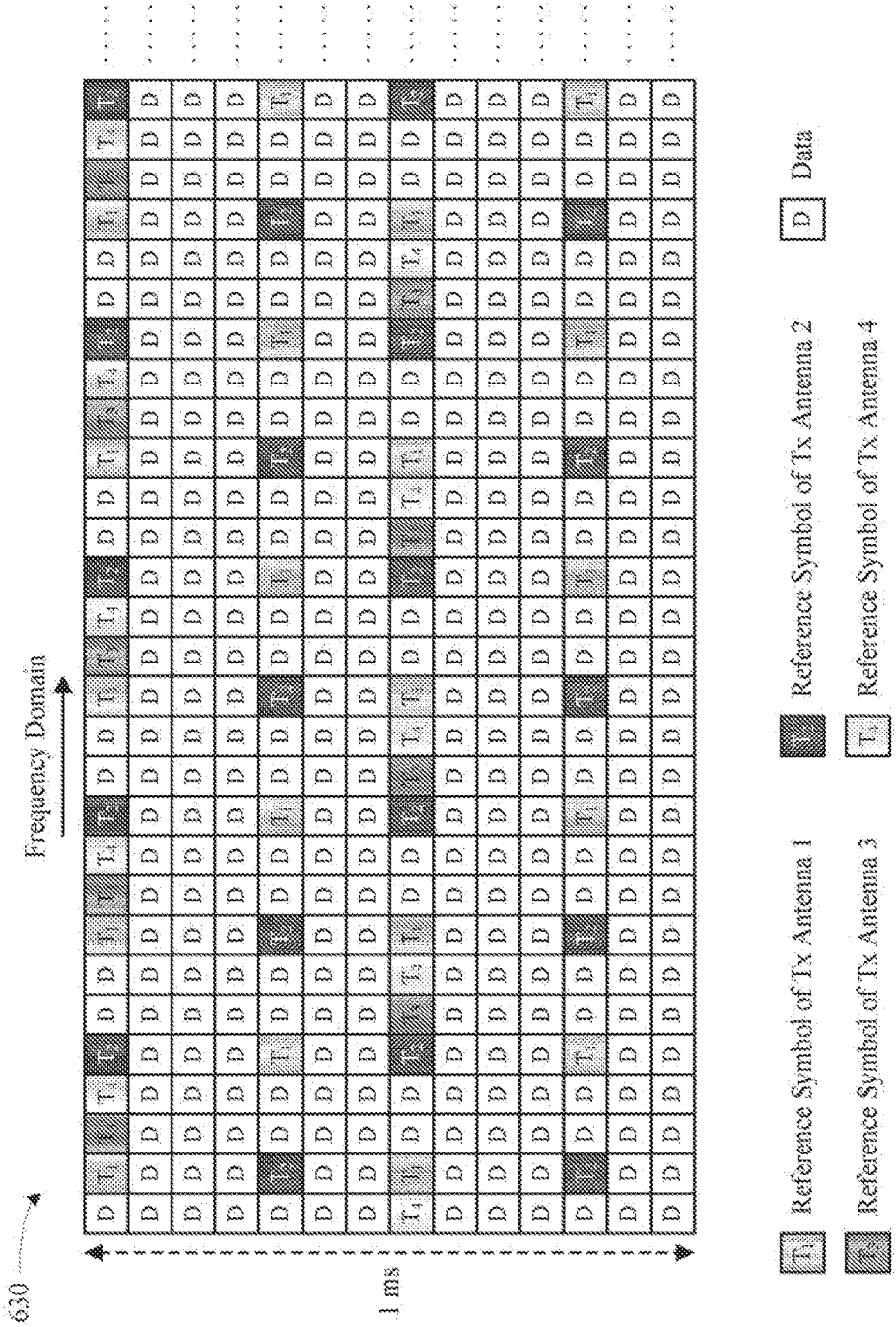

FIGS. 6A-6C are diagrams that illustrate example reference signal structures 610-630 that can be utilized for cell search in accordance with various aspects. In accordance with one aspect, a sequence utilized for construction of a reference signal can be frequency mapped to a series of pilot tones that can be transmitted at predetermined time intervals. In one example, reference signals can additionally be configured to include system parameters in order to convey those parameters to UEs (e.g., terminals 250) in the system. In accordance with another aspect, a pilot tone sequence utilized for a reference signal can be based on a number of transmit antennas at a cell that transmits the reference signal. For example, diagram 610 in FIG. 6A illustrates an example reference signal structure that can be utilized by a single transmit antenna. As illustrated in diagram 610, the transmit antenna can alternate in time between transmitting a first reference signal at a first set of frequencies and a second reference signal at a second set of frequencies. As another example, diagram 620 in FIG. 6B illustrates an example reference signal structure that can be utilized by a cell having two transmit antennas. As illustrated in diagram 620, each transmit antenna can alternate in time between transmitting pilot symbols at a first set of frequencies and a second set of frequencies in a similar manner to the single transmit antenna illustrated by diagram 610.

Additionally, diagram 630 in FIG. 6C illustrates an example reference signal structure that can be utilized, for example, by a cell having four transmit antennas. As illustrated in diagram 630, two of the four transmit antennas, denoted in diagram 630 as transmit (Tx) Antenna 1 and Tx Antenna 2, can alternate in time between transmitting pilot symbols at a first set of frequencies and a second set of frequencies in a similar manner to that illustrated by diagrams 610 and 620. In addition, diagram 630 illustrates that two additional transmit antennas, denoted as Tx Antenna 3 and Tx Antenna 4, can transmit on alternating sets of frequency subcarriers at the beginning of each 0.5 ms slot such that all 4 transmit antennas transmit pilot tones on adjacent frequency subcarriers at the beginning of each slot.

Figure 7:
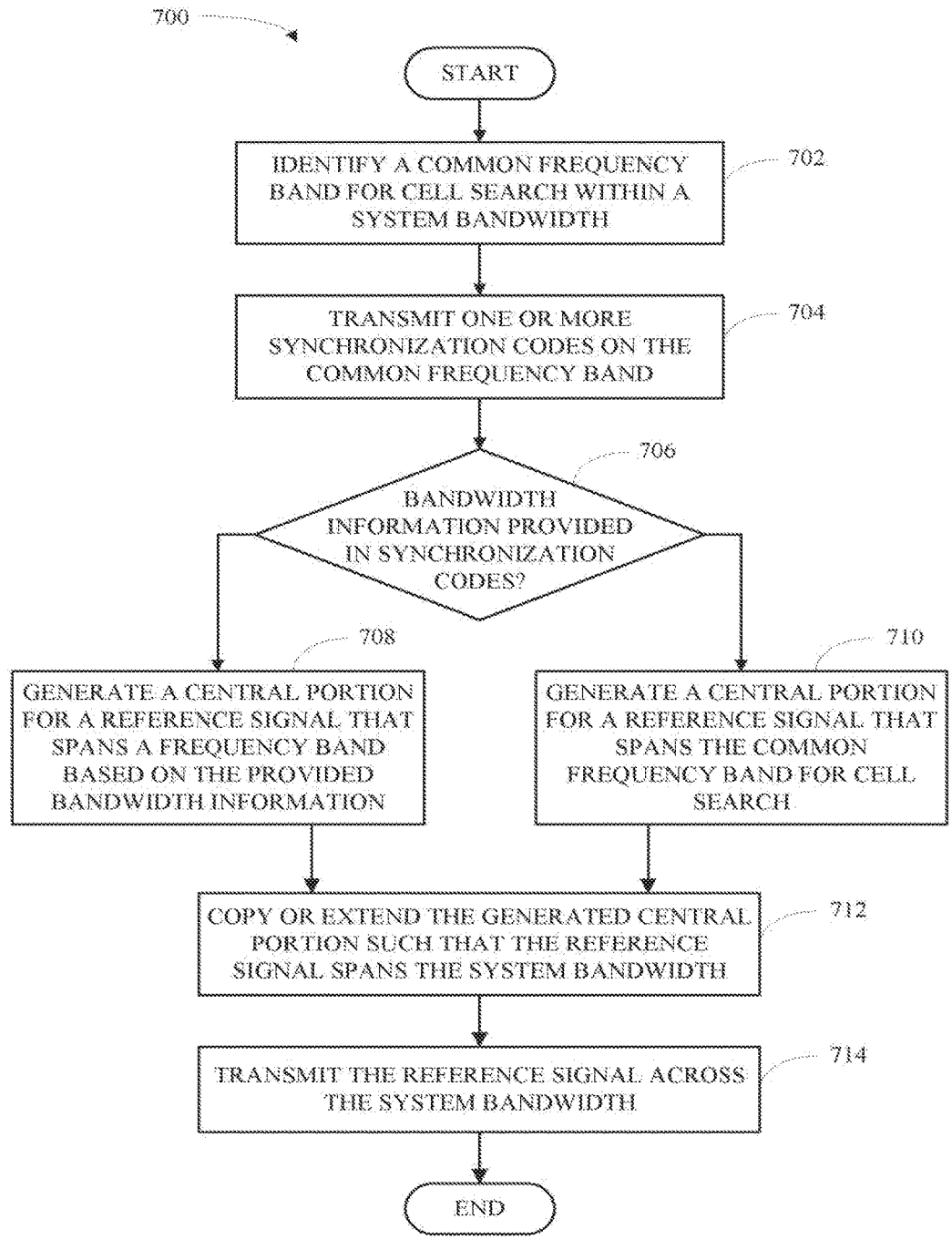
FIG. 7 is a flow diagram of a methodology for generating and transmitting a reference signal.
Figure 8:
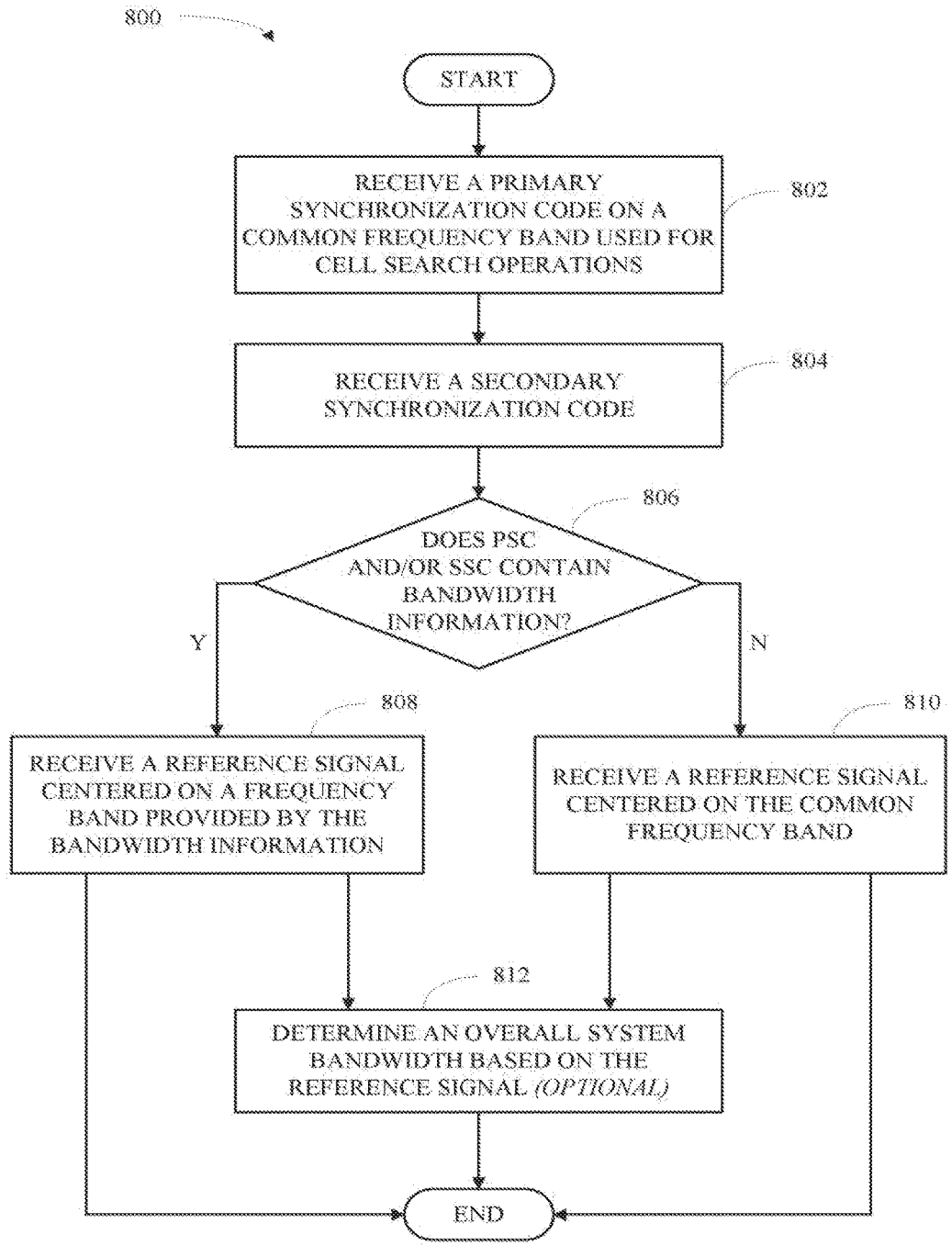
FIG. 8 is a flow diagram of a methodology for acquiring signals for cell search in a wireless communication system.
Figure 9:
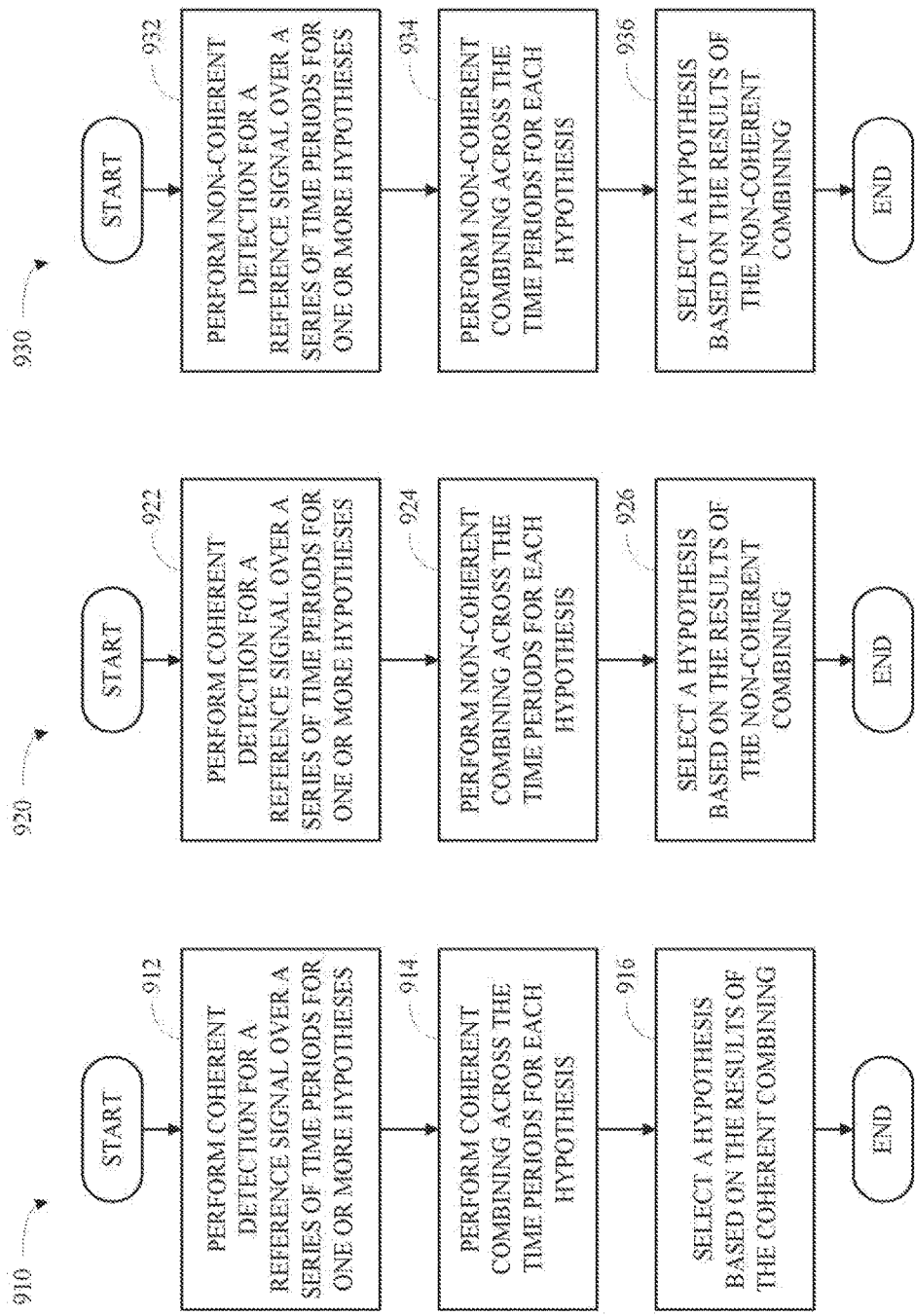
FIGS. 9A-9C are flow diagrams of methodologies for reference signal detection and processing.

Referring to FIGS. 7-9, methodologies for cell search in a wireless communication system are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 7, illustrated is a methodology 700 for generating and transmitting a reference signal (e.g., RS 236) in a wireless communication system (e.g., system 200). It is to be appreciated that methodology 700 can be performed by, for example, a base station (e.g., base station 210) and/or any other appropriate network entity. Methodology 700 begins at block 702, wherein a common frequency band for cell search is identified within a system bandwidth. In one example, a system in which methodology 700 can be performed can be capable of operation using multiple system bandwidths. However, until a terminal or other device is informed of a specific bandwidth at which the system is operating, it cannot efficiently communicate in the system. Thus, a frequency band can be used for cell acquisition at block 702 that is independent of a particular bandwidth used in the system. By way of example, the common frequency band can span 1.08 MHz, 1.25 MHz, or another frequency range that can be conveniently divided from multiple system bandwidths.

Methodology 700 can then continue to block 704, wherein one or more synchronization codes (e.g., PSC 232 and/or SSC 234) are transmitted on the common frequency band identified at block 702. Next, methodology 700 branches at block 706 based on whether information relating to the bandwidth of the system in which methodology 700 is being performed is provided in the synchronization codes transmitted at block 704. If bandwidth information is provided in the synchronization codes, methodology 700 can proceed to block 708, wherein a central portion for a reference signal (e.g., RS 236) is generated that spans a frequency band based on the provided bandwidth information. In accordance with one aspect, the manner in which the central portion for a reference signal can be generated at 708 can depend on whether complete or partial bandwidth information is provided by the synchronization codes at 706. For example, if the exact bandwidth of the system is provided at block 704, the central portion for the reference signal can span the entire system bandwidth, as illustrated by diagram 540 in FIG. 5B. On the other hand, if partial bandwidth information is instead provided, a central portion for the reference signal can be generated at block 708 that spans a subset of the system bandwidth. For example, if the synchronization codes transmitted at block 704 indicate that the system bandwidth is larger than a given bandwidth range threshold, a terminal that receives the synchronization codes can infer that the system bandwidth is at least as large as the threshold. Accordingly, a central portion for the reference signal at block 708 can be constructed that spans a frequency range corresponding to the threshold, as illustrated by diagrams 550 and 560 in FIG. 5B.

If, on the other hand, bandwidth information is not provided in the synchronization codes transmitted at block 704, methodology can instead branch from block 706 to block 710, wherein a central portion is generated for a reference signal that spans the common frequency band for cell search identified at block 702, as illustrated by diagrams 520 and 530 in FIG. 5A. Because, as noted above, the common frequency band identified at block 702 is independent of system bandwidth, generating a central portion for a reference signal at block 710 on the common frequency band guarantees that a terminal will be able to receive the central portion of the reference signal even with no knowledge of system bandwidth.

Upon generating a central portion for a reference signal as described at block 708 or block 710, methodology 700 can proceed to block 712, wherein the generated central portion is copied or extended such that the reference signal spans the entire system bandwidth. In one example, reference signals are transmitted across the entire bandwidth used by a system. However, as noted above, a terminal may only know that a portion of the bandwidth exists. Thus, if a central portion of a reference signal generated at block 708 or block 710 does not cover the entire system bandwidth due to insufficient knowledge of the system bandwidth at a terminal, the central portion can be copied or extended to cover the entire system bandwidth. In one example, the central portion can be copied to span the entire bandwidth by treating the central portion as a periodic block in time and frequency and tiling the periodic block along the system bandwidth as provided in diagram 520 of FIG. 5A and diagram 550 of FIG. 5B. Additionally and/or alternatively, the ends of the generated central portion of the reference signal can be extended to span the complete system bandwidth as illustrated in diagram 530 of FIG. 5A and diagram 560 of FIG. 5B. Once a reference signal has been modified to span the system bandwidth as described at block 712, methodology 700 can conclude at block 714, wherein the reference signal is transmitted across the system bandwidth.

FIG. 8 illustrates a methodology 800 for acquiring signals for cell search in a wireless communication system. It is to be appreciated that methodology 800 can be performed by, for example, a terminal (e.g., terminal 250) and/or any other suitable entity in a wireless communication system. Methodology 800 begins at block 802, wherein a primary synchronization code (e.g., PSC 232) is received on a common frequency band used for cell search operations. In one example, a system in which methodology 800 can be performed can be capable of operation under multiple bandwidths, and as a result a common frequency band of 1.08 MHz, 1.25 MHz, or another suitable size can be provided for communication of the PSC at block 802 as described with respect to methodology 700. Next, at block 804, a secondary synchronization code (e.g., SSC 234) is received. If the PSC received at block 802 provides bandwidth information, the SSC can be received at block 804 on a frequency band based on the provided bandwidth information. Otherwise, the SSC can also be received at block 804 on the common frequency band on which the PSC was received at block 802.

After receiving a PSC and SSC as described at blocks 802 and 804, methodology 800 continues to 806, where it is determined whether the PSC and/or SSC contain bandwidth information. Similar to methodology 700 supra, a reference signal can be constructed to span an entire bandwidth used by a system in which methodology 800 is performed. Thus, a technique by which an entity performing methodology 700 can detect a reference signal can vary depending on whether said entity has information regarding the system bandwidth.

If the PSC and/or SSC provide bandwidth information, methodology 800 can proceed to block 808, wherein a reference signal centered on a frequency band provided by the bandwidth information in the PSC and/or SSC is received. In accordance with one aspect, bandwidth information provided by the PSC and/or SSC can provide an exact bandwidth or a bandwidth figure in relation to a range. If the bandwidth information corresponds to an exact bandwidth, the reference signal can be received at block 808 on the entire bandwidth. If the bandwidth information is instead provided in relation to a range, operation at block 808 can depend on whether the bandwidth is greater than, equal to, or less than a range threshold. If the bandwidth information indicates that the system bandwidth is greater than or equal to the range threshold, then it can be inferred by an entity performing methodology 800 that the system bandwidth is at least as large as the range threshold. Accordingly, a reference signal can be received at block 808 on a bandwidth corresponding to the range threshold. On the other hand, if the bandwidth information indicates that the system bandwidth is less than the range threshold, the reference signal can instead be received at block 808 on the common frequency band utilized for the PSC at block 802. If the PSC and/or SSC do not provide bandwidth information, then methodology 800 can proceed from block 806 to block 810, wherein a reference signal is received on the common frequency band utilized for the PSC at block 802.

After performing the acts described at blocks 808 and/or 810, methodology 800 can conclude. Alternatively, methodology 800 can proceed to block 812, wherein the overall system bandwidth is determined based on the received reference signal. If a reference signal received at block 808 or block 810 contains information regarding system bandwidth, the system bandwidth can be determined at block 812 based on this information. Otherwise, bandwidth can be determined by, for example, detecting a bandwidth through which the detected reference signal has been copied or extended, as illustrated in diagrams 520-560 at FIGS. 5A-5B.

FIGS. 9A-9C illustrate various methodologies 910-930 for reference signal detection and processing in a wireless communication system. Methodologies 910-930 can be performed by, for example, a terminal and/or any other suitable entity in a wireless communication system. In accordance with one aspect, a reference signal can be composed of a series of OFDM symbols transmitted over corresponding time periods (e.g., 0.5 ms). Further, at the time a reference signal is transmitted, a terminal may not know one or more parameters regarding how the reference signal was transmitted. For example, the terminal may not know the number of transmit antennas used to transmit a given reference signal, which can affect the structure of the reference signal as described with regard to FIGS. 6A-6C supra. As a result, the terminal can attempt to detect a reference signal as illustrated by one or more of FIGS. 9A-9C under a set of hypotheses that can respectively correspond to numbers of transmit antennas in order to determine a number of transmit antennas that transmitted the reference signal.

FIGS. 9A-9C illustrate various methodologies 910-930 that can be utilized by a terminal for detecting a reference signal. As generally illustrated by FIGS. 9A-9C, a reference signal can be detected by performing detection for a single OFDM symbol or time period under a series of hypotheses and then combining these partial results for the series of hypotheses to determine an appropriate hypothesis. Turning specifically to FIG. 9A, a flow diagram of a first methodology 910 for detecting and processing a reference signal is illustrated. Methodology 910 begins at block 912, wherein coherent detection is performed for a reference signal over a series of time periods for one or more hypotheses. In one example, coherent detection utilizes a fixed channel reference obtained from another channel (e.g., a channel on which a PSC 232 and/or SSC 234 is transmitted) to locate pilot tones that constitute a reference signal in frequency. These tones can then be summed for each time period and hypothesis to be considered at block 912. Next, at block 914, coherent combining is performed across the time periods for each hypothesis considered at block 912. More specifically, coherent combining can be performed at block 914 by performing a direct summation for each hypothesis of the coherently detected partial results obtained at block 912 for the series of time periods. Upon completing the combining at block 914, methodology 910 can conclude at block 916, wherein a hypothesis is selected based on the results of the combining.

FIG. 9B illustrates a second methodology 920 for detecting and processing a reference signal. Methodology 920 begins at block 922, wherein coherent detection is performed for a reference signal over a series of time periods for one or more hypotheses in a similar manner to block 912 of methodology 910. Next, at block 924, non-coherent combining is performed across the time periods for each hypothesis considered at block 922. In one example, coherently detected partial results obtained at block 922 can be non-coherently combined at block 924 by first obtaining the energy of each partial result and then summing the total energy over the time periods for each hypothesis to be considered. Methodology 920 can then conclude at block 926 by selecting a hypothesis based on the results of the combining performed at block 924.

FIG. 9C illustrates a third methodology 930 for detecting and processing a reference signal. Methodology 930 begins at block 932, wherein non-coherent detection is performed for a reference signal over a series of time periods for one or more hypotheses. In contrast to the coherent detection performed at blocks 912 and 922, non-coherent detection does not utilize a channel reference. Instead, a reference signal can be directly summed in the frequency domain for each time period and hypothesis to be considered at block 932. Next, at block 934, non-coherent combining is performed across the time periods for each hypothesis considered at block 932. In one example, non-coherent combining at block 934 can be performed by performing a direct summation of the partial results obtained at block 932 over the time periods for each hypothesis to be considered. Finally, at block 936, a hypothesis can be selected based on the results of the combining performed at block 934.

Figure 10:
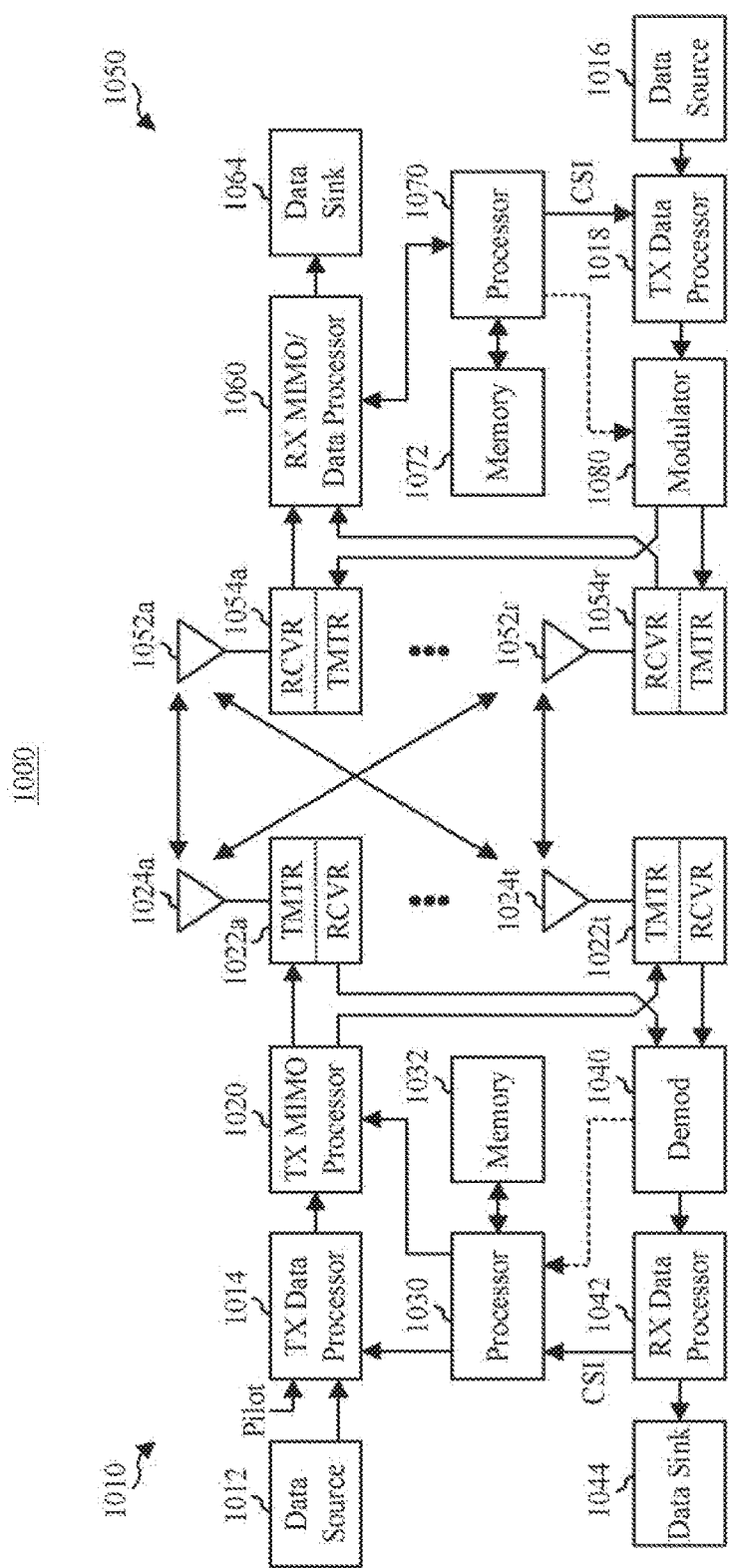
FIG. 10 is a block diagram illustrating an example wireless communication system in which various aspects described herein may function.

Referring now to FIG. 10, a block diagram illustrating an example wireless communication system 1000 in which one or more embodiments described herein can function is provided. In one example, system 1000 is a multiple-input multiple-output (MIMO) system that includes a transmitter system 1010 and a receiver system 1050. It should be appreciated, however, that transmitter system 1010 and/or receiver system 1050 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1010 and/or receiver system 1050 described herein could be utilized in connection with a single output to single input antenna system.

In accordance with one aspect, traffic data for a number of data streams are provided at transmitter system 1010 from a data source 1012 to a transmit (TX) data processor 1014. In one example, each data stream can then be transmitted via a respective transmit antenna 1024. Additionally, TX data processor 1014 can format, code, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1050 to estimate channel response. Back at transmitter system 1010, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1030.

Next, modulation symbols for all data streams can be provided to a TX processor 1020, which can further process the modulation symbols (e.g., for OFDM). TX MIMO processor 1020 can then provides $N_T$ modulation symbol streams to $N_T$ transceivers 1022a through 1022t. In one example, each transceiver 1022 can receive and process a respective symbol stream to provide one or more analog signals. Each transceiver 1022 can then further condition (e.g., amplify, filter, and upconvert) the analog signals to provide a modulated signal suitable for transmission over a MIMO channel. Accordingly, $N_T$ modulated signals from transceivers 1022a through 1022t can then be transmitted from $N_T$ antennas 1024a through 1024t, respectively.

In accordance with another aspect, the transmitted modulated signals can be received at receiver system 1050 by $N_R$ antennas 1052a through 1052r. The received signal from each antenna 1052 can then be provided to respective transceivers 1054. In one example, each transceiver 1054 can condition (e.g., filter, amplify, and downconvert) a respective received signal, digitize the conditioned signal to provide samples, and then processes the samples to provide a corresponding "received" symbol stream. An RX MIMO/data processor 1060 can then receive and process the $N_R$ received symbol streams from $N_R$ transceivers 1054 based on a particular receiver processing technique to provide $N_T$ "detected" symbol streams. In one example, each detected symbol stream can include symbols that are estimates of the modulation symbols transmitted for the corresponding data stream. RX processor 1060 can then process each symbol stream at least in part by demodulating, deinterleaving, and decoding each detected symbol stream to recover traffic data for a corresponding data stream. Thus, the processing by RX processor 1060 can be complementary to that performed by TX MIMO processor 1020 and TX data processor 1014 at transmitter system 1010. RX processor 1060 can additionally provide processed symbol streams to a data sink 1064.

In accordance with one aspect, the channel response estimate generated by RX processor 1060 can be used to perform space/time processing at the receiver, adjust power levels, change modulation rates or schemes, and/or other appropriate actions. Additionally, RX processor 1060 can further estimate channel characteristics such as, for example, signal-to-noise-and-interference ratios (SNRs) of the detected symbol streams. RX processor 1060 can then provide estimated channel characteristics to a processor 1070. In one example, RX processor 1060 and/or processor 1070 can further derive an estimate of the "operating" SNR for the system. Processor 1070 can then provide channel state information (CSI), which can comprise information regarding the communication link and/or the received data stream. This information can include, for example, the operating SNR. The CSI can then be processed by a TX data processor 1018, modulated by a modulator 1080, conditioned by transceivers 1054a through 1054r, and transmitted back to transmitter system 1010. In addition, a data source 1016 at receiver system 1050 can provide additional data to be processed by TX data processor 1018.

Back at transmitter system 1010, the modulated signals from receiver system 1050 can then be received by antennas 1024, conditioned by transceivers 1022, demodulated by a demodulator 1040, and processed by a RX data processor 1042 to recover the CSI reported by receiver system 1050. In one example, the reported CSI can then be provided to processor 1030 and used to determine data rates as well as coding and modulation schemes to be used for one or more data streams. The determined coding and modulation schemes can then be provided to transceivers 1022 for quantization and/or use in later transmissions to receiver system 1050. Additionally and/or alternatively, the reported CSI can be used by processor 1030 to generate various controls for TX data processor 1014 and TX MIMO processor 1020. In another example, CSI and/or other information processed by RX data processor 1042 can be provided to a data sink 1044.

In one example, processor 1030 at transmitter system 1010 and processor 1070 at receiver system 1050 direct operation at their respective systems. Additionally, memory 1032 at transmitter system 1010 and memory 1072 at receiver system 1050 can provide storage for program codes and data used by processors 1030 and 1070, respectively. Further, at receiver system 1050, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 11:
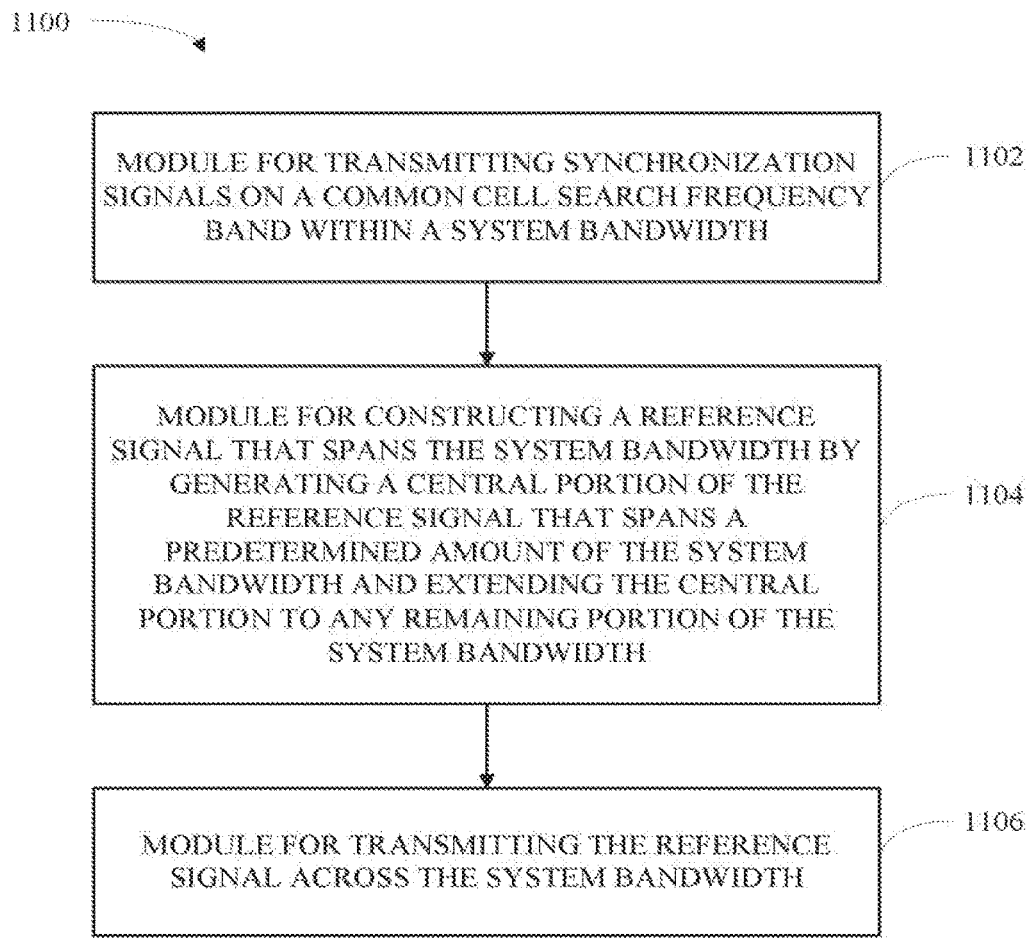
FIG. 11 is a block diagram of an apparatus that facilitates construction and transmission of a reference signal in a wireless communication system.

FIG. 11 illustrates an apparatus 1100 that facilitates construction and transmission of a reference signal (e.g., RS 236) in a wireless communication system (e.g., system 200). It is to be appreciated that apparatus 1100 is illustrated as including functional blocks, which can be functional blocks that represent functions implemented by a processor, software, or a combination thereof (e.g., firmware). Apparatus 1100 can be implemented in a Node B (e.g., base station 210) and/or another suitable network entity and can include a module 1102 for transmitting synchronization signals on a common cell search frequency band within a system bandwidth, a module 1104 for constructing a reference signal that spans the system bandwidth by generating a central portion of the reference signal that spans a predetermined amount of the system bandwidth and extending the central portion to any remaining portion of the system bandwidth, and a module 1106 for transmitting the reference signal across the system bandwidth.

Figure 12:
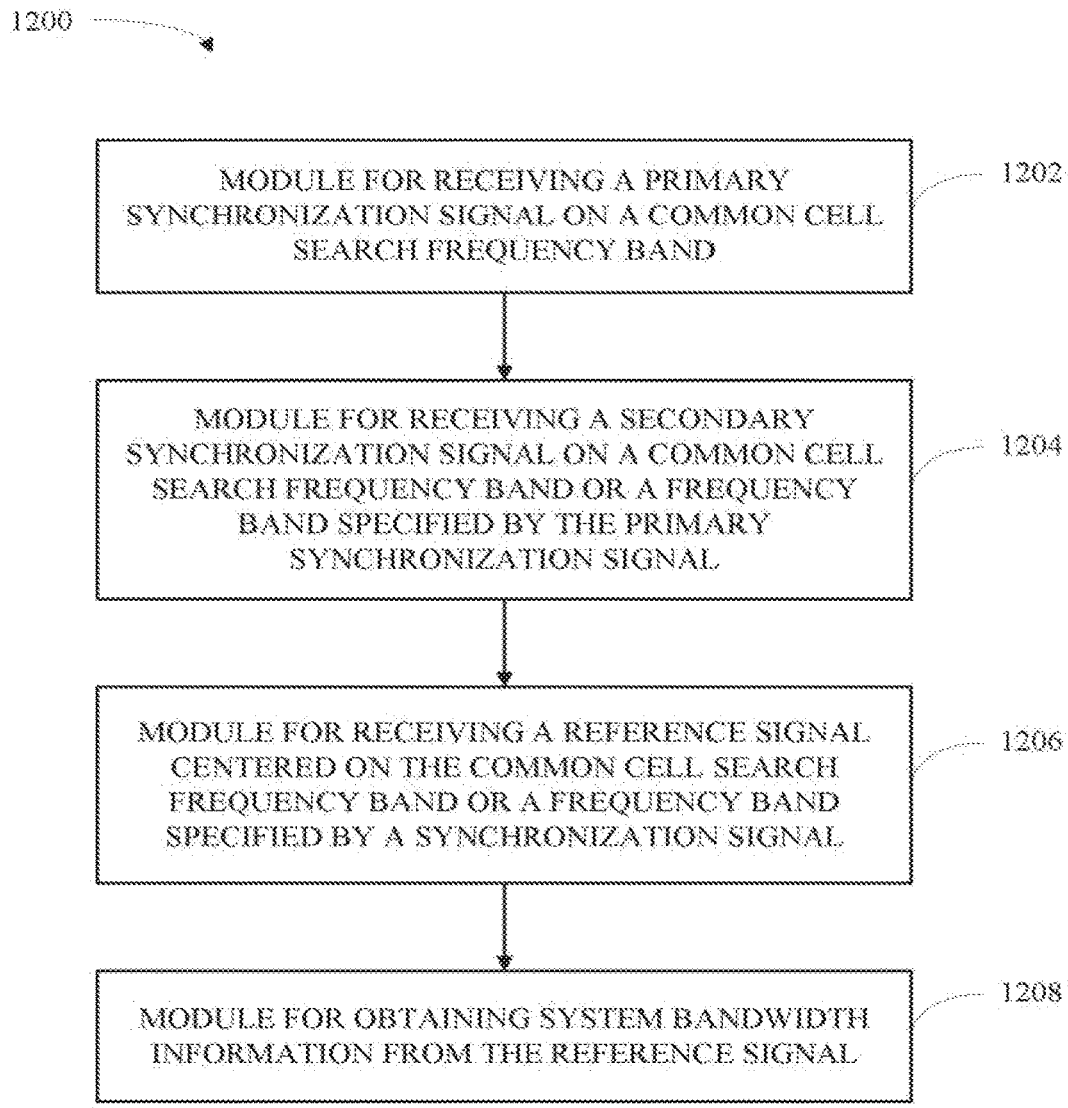
FIG. 12 is a block diagram of an apparatus that facilitates acquisition of signals for use in connection with a cell search procedure.

FIG. 12 illustrates an apparatus 1200 that facilitates acquisition of signals for use in connection with a cell search procedure. It is to be appreciated that apparatus 1200 is illustrated as including functional blocks, which can be functional blocks that represent functions implemented by a processor, software, or a combination thereof (e.g., firmware). Apparatus 1200 can be implemented in user equipment (e.g., a terminal 250) and/or another suitable network entity and can include a module 1202 for receiving a primary synchronization signal (e.g., PSC 232) on a common cell search frequency band, a module 1204 for receiving a secondary synchronization signal (e.g., SSC 234) on a common cell search frequency band or a frequency band specified by the primary synchronization signal, a module 1206 for receiving a reference signal (e.g., RS 236) centered on the common cell search frequency band or a frequency band specified by a synchronization signal, and a module 1208 for obtaining system bandwidth information from the reference signal.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

The invention claimed is:

1. A method for wireless communication, comprising:
   receiving, by a terminal, one or more synchronization codes over a cell search bandwidth of a cell;
   determining, by the terminal, that a system bandwidth of the cell is as large as, or larger than, a bandwidth threshold based at least in part on the one or more synchronization codes; and
   receiving, by the terminal, a reference signal or a broadcast channel, or both, over the bandwidth threshold based at least in part on determining that the system bandwidth for the cell is as large as, or larger than, the bandwidth threshold.

2. The method of claim 1, wherein the bandwidth threshold is greater than one or more of a plurality of available system bandwidths, the method further comprising:
   determining, by the terminal, that a subset of the plurality of the available system bandwidths are available for the cell based at least in part on determining that the system bandwidth for the cell is as large as, or larger than, the bandwidth threshold.

3. The method of claim 1, wherein a size of the system bandwidth is different than a size of the bandwidth threshold.

4. The method of claim 1, wherein the one or more synchronization codes comprise partial bandwidth information for the system bandwidth.

5. The method of claim 1, wherein the one or more synchronization codes comprise complete bandwidth information for the system bandwidth.

6. The method of claim 1, further comprising:
   detecting the reference signal or the broadcast channel, or both, based at least in part on the bandwidth threshold.

7. The method of claim 1, wherein the cell search bandwidth spans a bandwidth of 1.08 MHz.

8. The method of claim 1, wherein the cell search bandwidth spans a bandwidth of 1.25 MHz.

9. A method for wireless communications, comprising:
   receiving, by a terminal, one or more synchronization codes over a cell search bandwidth of a cell; and
   receiving, by the terminal, a reference signal and a broadcast channel over a second bandwidth that is larger than the cell search bandwidth, wherein the reference signal and the broadcast channel are distinct from the one or more synchronization codes.

10. The method of claim 9, wherein the reference signal and the broadcast channel are non-overlapping in time with the one or more synchronization codes.

11. The method of claim 9, further comprising:
    determining a minimum bandwidth for the reference signal, wherein the second bandwidth is as large as, or larger than, the minimum bandwidth.

12. The method of claim 9, wherein the cell search bandwidth spans a bandwidth of 1.08 MHZ.

13. The method of claim 9, wherein the cell search bandwidth spans a bandwidth of 1.25 MHZ.

14. A method for wireless communications, comprising:
receiving, by a terminal, one or more synchronization codes over a cell search bandwidth of a cell; and
receiving, by the terminal, a reference signal over a second bandwidth based at least in part on the one or more synchronization codes, wherein the reference signal conveys one or more system parameters for the cell, and wherein the reference signal is non-overlapping in time with the one or more synchronization codes.

15. The method of claim 14, wherein a size of the second bandwidth is equivalent to a size of the cell search bandwidth.

16. The method of claim 14, wherein a first size of the second bandwidth is equivalent to a size of a bandwidth threshold indicated by the one or more synchronization codes, the size of the bandwidth threshold being larger than the cell search bandwidth.

17. The method of claim 16, wherein the reference signal conveys more information if the second bandwidth is of the first size than of a second size equivalent to a size of the cell search bandwidth.

18. The method of claim 14, wherein the one or more system parameters comprise a cell ID or information regarding system bandwidth, or both.

19. A method for wireless communications, comprising:
receiving, by a terminal, one or more synchronization codes over a cell search bandwidth, wherein the one or more synchronization codes provide a channel reference for a reference signal and a broadcast channel, and wherein the reference signal and the broadcast channel are non-overlapping in time with the one or more synchronization codes.

20. The method of claim 19, further comprising:
applying a series of hypotheses to detect the reference signal or the broadcast channel, or both, based at least in part on the one or more synchronization codes, wherein at least one hypothesis of the series of hypotheses is based on coherent detection of the reference signal or the broadcast channel, or both, and at least one other hypothesis of the series of hypotheses is based on non-coherent detection of the reference signal or the broadcast channel, or both; and
decoding the reference signal based at least in part on the applied series of hypotheses.

21. The method of claim 20, further comprising:
locating, for one or more hypotheses, one or more pilot tones of the reference signal during a time period based at least in part on the channel reference;
summing, for each hypothesis of the one or more hypotheses, the one or more pilot tones for the time period; and
selecting a hypotheses of the one or more hypotheses based at least in part on the summing.

22. The method of claim 21, further comprising:
determining a first partial result for the at least one hypothesis and a second partial result for the at least on other hypothesis, wherein the first partial result and the second partial result are summed.

23. The method of claim 19, wherein the channel reference is a fixed channel reference.

24. An apparatus for wireless communications, comprising:
a processor configured to:
receive one or more synchronization codes over a cell search bandwidth of a cell;
determine that a system bandwidth of the cell is as large as, or larger than, a bandwidth threshold based at least in part on the one or more synchronization codes; and
receive a reference signal or a broadcast channel, or both, over the bandwidth threshold based at least in part on determining that the system bandwidth for the cell is as large as, or larger than, the bandwidth threshold.

25. The apparatus of claim 24, wherein the bandwidth threshold is greater than one or more of a plurality of available system bandwidths, the method further comprising:
determine that a subset of the plurality of the available system bandwidths are available for the cell based at least in part on determining that the system bandwidth for the cell is as large as, or larger than, the bandwidth threshold.

26. The apparatus of claim 24, wherein a size of the system bandwidth is different than a size of the bandwidth threshold.

27. The apparatus of claim 24, wherein the one or more synchronization codes comprise partial bandwidth information for the system bandwidth.

28. The apparatus of claim 24, wherein the one or more synchronization codes comprise complete bandwidth information for the system bandwidth.

29. The apparatus of claim 24, further comprising:
detect the reference signal or the broadcast channel, or both, based at least in part on the bandwidth threshold.

30. The apparatus of claim 24, wherein the cell search bandwidth spans a bandwidth of 1.08 MHz.

31. The apparatus of claim 24, wherein the cell search bandwidth spans a bandwidth of 1.25 MHz.

32. An apparatus for wireless communications, comprising:
a processor configured to:
receive one or more synchronization codes over a cell search bandwidth of a cell; and
receive a reference signal and a broadcast channel over a second bandwidth that is larger than the cell search bandwidth, wherein the reference signal and the broadcast channel are distinct from the one or more synchronization codes.

33. The apparatus of claim 32, wherein the reference signal and the broadcast channel are non-overlapping in time with the one or more synchronization codes.

34. The apparatus of claim 32, further comprising:
determine a minimum bandwidth for the reference signal, wherein the second bandwidth is as large as, or larger than, the minimum bandwidth.

35. The apparatus of claim 32, wherein the cell search bandwidth spans a bandwidth of 1.08 MHZ.

36. The apparatus of claim 32, wherein the cell search bandwidth spans a bandwidth of 1.25 MHZ.

37. An apparatus for wireless communications, comprising:
a processor configured to:
receive one or more synchronization codes over a cell search bandwidth of a cell; and
receive a reference signal over a second bandwidth based at least in part on the one or more synchronization codes, wherein the reference signal conveys one or more system parameters for the cell, and wherein the reference signal is non-overlapping in time with the one or more synchronization codes.

38. The apparatus of claim 37, wherein a size of the second bandwidth is equivalent to a size of the cell search bandwidth.

39. The apparatus of claim 37, wherein a first size of the second bandwidth is equivalent to a size of a bandwidth threshold indicated by the one or more synchronization codes, the size of the bandwidth threshold being larger than the cell search bandwidth.

40. The apparatus of claim 39, wherein the reference signal conveys more information if the second bandwidth is of the first size than of a second size equivalent to a size of the cell search bandwidth.

41. The apparatus of claim 37, wherein the one or more system parameters comprise a cell ID or information regarding system bandwidth, or both.

42. An apparatus for wireless communications, comprising:
a processor configured to:
receive one or more synchronization codes over a cell search bandwidth, wherein the one or more synchronization codes provide a channel reference for a reference signal and a broadcast channel, and wherein the reference signal and the broadcast channel are non-overlapping in time with the one or more synchronization codes.

43. The apparatus of claim 42, further comprising:
apply a series of hypotheses to detect the reference signal or the broadcast channel, or both, based at least in part on the one or more synchronization codes, wherein at least one hypothesis of the series of hypotheses is based on coherent detection of the reference signal or the broadcast channel, or both, and at least one other hypothesis of the series of hypotheses is based on non-coherent detection of the reference signal or the broadcast channel, or both; and
decode the reference signal based at least in part on the applied series of hypotheses.

44. The apparatus of claim 43, further comprising:
locate, for one or more hypotheses, one or more pilot tones of the reference signal during a time period based at least in part on the channel reference;
sum, for each hypothesis of the one or more hypotheses, the one or more pilot tones for the time period; and
select a hypotheses of the one or more hypotheses based at least in part on the summing.

45. The apparatus of claim 44, further comprising:
determine a first partial result for the at least one hypothesis and a second partial result for the at least on other hypothesis, wherein the first partial result and the second partial result are summed.

46. The apparatus of claim 42, wherein the channel reference is a fixed channel reference.

* * * * *